(12) United States Patent
Tan et al.

(10) Patent No.: US 10,128,901 B2
(45) Date of Patent: Nov. 13, 2018

(54) GENERATION METHOD FOR DISTRIBUTED CHANNEL HOPPING SYSTEM IN COGNITIVE RADIO NETWORKS

(71) Applicant: University of Electronic Science and Technology of China, Chengdu (CN)

(72) Inventors: Xuesong Tan, Chengdu (CN); Chao Zhou, Chengdu (CN); Jie Chen, Chengdu (CN)

(73) Assignee: UNIVEERSITY OF ELECTRONIC SCIENCE AND TECHNOLOGY OF CHINA, Chengdu (CN)

(*) Notice: Subject to any disclaimer, the term of this patent is extended or adjusted under 35 U.S.C. 154(b) by 0 days.

(21) Appl. No.: 15/487,457

(22) Filed: Apr. 14, 2017

(65) Prior Publication Data

US 2017/0302331 A1 Oct. 19, 2017

(30) Foreign Application Priority Data

Apr. 14, 2016 (CN) .......................... 2016 1 0231761

(51) Int. Cl.
*H04B 1/713* (2011.01)
*H04W 72/04* (2009.01)

(52) U.S. Cl.
CPC ........ *H04B 1/713* (2013.01); *H04W 72/0446* (2013.01)

(58) Field of Classification Search
CPC ..... H04W 16/14; H04W 36/24; H04W 40/24; H04W 48/08; H04W 88/06; H04W 88/10; H04W 40/00; H04W 40/12; H04J 3/0602; H04L 27/2601; H04L 5/0016; H04L 5/0035

See application file for complete search history.

(56) References Cited

U.S. PATENT DOCUMENTS

| | | | | |
|---|---|---|---|---|
| 2009/0252178 A1* | 10/2009 | Huttunen | ............ | H04W 72/085 370/445 |
| 2012/0257587 A1* | 10/2012 | Esmailzadeh | ........ | H04B 7/2628 370/329 |
| 2015/0085817 A1* | 3/2015 | Liu | ........ | H04L 5/0012 370/330 |
| 2015/0223187 A1* | 8/2015 | Cheon | ................... | H04W 16/14 370/254 |
| 2016/0134396 A1* | 5/2016 | Guerreiro | ............ | H04L 5/0033 370/329 |

* cited by examiner

*Primary Examiner* — Khanh C Tran
(74) *Attorney, Agent, or Firm* — Mathias Scholl P.C.; Matthias Scholl

(57) ABSTRACT

A method for generating a distributed channel hopping system in cognitive radio networks. The method includes: 1) providing a symmetric asynchronous CH system comprising n periodic CH sequences such that each period of a CH sequence comprises exactly L frames and each frame comprises n timeslots; 2) labelling the n periodic CH sequences in the constructed CH system; 3) hopping, by the CH sequence i, to the channel (lM+j mod N) in each timeslot $t_{i,j,d} \in U_{i,j}$ of the frame l; and 4) hopping, by the CH sequence i, to an arbitrary channel $h \notin \{0, 1, \ldots, N-1\}$ in each timeslot $t \notin Z_n \backslash ROT(U, i)$ of the frame l.

2 Claims, 20 Drawing Sheets

| Timeslot Index: | 0 | 1 | 2 | 0 | 1 | 2 | 0 | 1 | 2 |
|---|---|---|---|---|---|---|---|---|---|
| CH sequence 0 | h | 0 | 0 | h | 1 | 1 | h | 2 | 2 |
| CH sequence 1 | 0 | h | 0 | 1 | h | 1 | 2 | h | 2 |
| CH sequence 2 | 0 | 0 | h | 1 | 1 | h | 2 | 2 | h |

← Frame 0 →←  Frame 1 →← Frame 2 →

| Timeslot Index: | 0 | 1 | 2 | 3 | 0 | 1 | 2 | 3 | 0 | 1 | 2 | 3 |
|---|---|---|---|---|---|---|---|---|---|---|---|---|
| CH sequence 0 | 0 | 1 | 2 | 1 | 1 | 2 | 2 | 0 | 2 | 0 | 1 | 0 |
| CH sequence 1 | 0 | 2 | 1 | 2 | 1 | 0 | 0 | 2 | 2 | 1 | 1 | 1 |
| CH sequence 2 | 1 | 2 | 0 | 2 | 2 | 0 | 0 | 0 | 0 | 1 | 2 | 0 |
| CH sequence 3 | 1 | 0 | 2 | 1 | 1 | 1 | 2 | 2 | 0 | 2 | 1 | 1 |
| CH sequence 4 | 2 | 0 | 1 | 0 | 0 | 2 | 1 | 2 | 1 | 2 | 0 | 0 |
| CH sequence 5 | 2 | 1 | 0 | 2 | 0 | 0 | 2 | 0 | 1 | 0 | 2 | 1 |

←—— Frame 0 ——→|←—— Frame 1 ——→|←—— Frame 2 ——→

FIG. 5

| Timeslot Index: | 0 | 1 | 2 | 0 | 1 | 2 | 0 | 1 | 2 |
|---|---|---|---|---|---|---|---|---|---|
| CH sequence 0 | 0 | 0 | 1 | 1 | 1 | 1 | 2 | 2 | 2 |
| CH sequence 1 | 0 | 1 | 1 | 1 | 2 | 2 | 2 | 0 | 0 |
| CH sequence 2 | 1 | 1 | 0 | 2 | 2 | 1 | 0 | 0 | 2 |
| CH sequence 3 | 1 | 0 | 1 | 2 | 1 | 2 | 0 | 2 | 0 |

|←—Frame 0—→|←—Frame 1—→|←—Frame 2—→|

FIG. 6

| Timeslot Index: | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| CH sequence 0  | 0 | 0 | 0 | 1 | 1 | 1 | 1 | 2 | 2 | 0 | 2 | 1 | 2 | 2 | 2 |
| CH sequence 1  | 2 | 0 | 0 | 0 | 1 | 1 | 1 | 2 | 2 | 1 | 0 | 2 | 1 | 2 | 2 |
| CH sequence 2  | 2 | 2 | 0 | 0 | 0 | 1 | 1 | 1 | 0 | 2 | 2 | 1 | 0 | 1 | 2 |
| CH sequence 3  | 2 | 2 | 2 | 0 | 0 | 0 | 1 | 1 | 1 | 0 | 2 | 0 | 2 | 1 | 1 |
| CH sequence 4  | 1 | 2 | 2 | 2 | 0 | 0 | 0 | 1 | 1 | 1 | 0 | 2 | 0 | 0 | 2 |
| CH sequence 5  | 2 | 1 | 2 | 2 | 2 | 0 | 0 | 0 | 1 | 1 | 1 | 0 | 2 | 1 | 0 |
| CH sequence 6  | 0 | 2 | 1 | 2 | 2 | 2 | 0 | 0 | 0 | 1 | 1 | 1 | 0 | 2 | 1 |
| CH sequence 7  | 1 | 0 | 2 | 1 | 2 | 2 | 2 | 0 | 0 | 0 | 1 | 1 | 1 | 0 | 2 |
| CH sequence 8  | 2 | 1 | 0 | 2 | 1 | 2 | 2 | 2 | 0 | 0 | 0 | 1 | 1 | 1 | 0 |
| CH sequence 9  | 0 | 2 | 1 | 0 | 2 | 1 | 2 | 2 | 2 | 0 | 0 | 0 | 1 | 1 | 1 |
| CH sequence 10 | 1 | 0 | 2 | 1 | 0 | 2 | 1 | 2 | 2 | 2 | 0 | 0 | 0 | 1 | 1 |
| CH sequence 11 | 1 | 1 | 0 | 2 | 1 | 0 | 2 | 1 | 2 | 2 | 2 | 0 | 0 | 0 | 1 |
| CH sequence 12 | 1 | 1 | 1 | 0 | 2 | 1 | 0 | 2 | 1 | 2 | 2 | 2 | 0 | 0 | 0 |
| CH sequence 13 | 0 | 1 | 1 | 1 | 0 | 2 | 1 | 0 | 2 | 1 | 2 | 2 | 2 | 0 | 0 |
| CH sequence 14 | 0 | 0 | 1 | 1 | 1 | 0 | 2 | 1 | 0 | 2 | 1 | 2 | 2 | 2 | 0 |

FIG. 13

| (n,k)-MDS | | $\lfloor \frac{n}{k} \rfloor$ | Number of disjoint MDSs | | (n,k)-MDS | | $\lfloor \frac{n}{k} \rfloor$ | Number of disjoint MDSs | |
|---|---|---|---|---|---|---|---|---|---|
| n | k | | Exhaustive search | Heuristic search | n | k | | Exhaustive search | Heuristic search |
| 3 | 2 | 1 | 1 | 1 | 39 | 7 | 5 | 5 | 5 |
| 4 | 3 | 1 | 1 | 1 | 40 | 8 | 5 | 5 | 5 |
| 5 | 3 | 1 | 1 | 1 | 41 | 8 | 5 | 5 | 5 |
| 6 | 3 | 2 | 2 | 2 | 42 | 8 | 5 | 5 | 5 |
| 7 | 3 | 2 | 2 | 2 | 43 | 8 | 5 | 5 | 5 |
| 8 | 4 | 2 | 2 | 2 | 44 | 8 | 5 | 5 | 5 |
| 9 | 4 | 2 | 2 | 2 | 45 | 8 | 5 | 5 | 5 |
| 10 | 4 | 2 | 2 | 2 | 46 | 8 | 5 | 5 | 5 |
| 11 | 4 | 2 | 2 | 2 | 47 | 8 | 5 | 5 | 5 |
| 12 | 4 | 3 | 2 | 2 | 48 | 8 | 6 | 6 | 4 |
| 13 | 4 | 3 | 2 | 2 | 49 | 8 | 6 | 6 | 6 |
| 14 | 5 | 2 | 2 | 2 | 50 | 8 | 6 | 5 | 5 |
| 15 | 5 | 3 | 3 | 3 | 51 | 8 | 6 | 5 | 5 |
| 16 | 5 | 3 | 3 | 3 | 52 | 9 | 5 | 5 | 5 |
| 17 | 5 | 3 | 3 | 3 | 53 | 9 | 5 | 5 | 5 |
| 18 | 5 | 3 | 3 | 3 | 54 | 9 | 6 | 6 | 5 |
| 19 | 5 | 3 | 3 | 3 | 55 | 9 | 6 | 6 | 6 |
| 20 | 6 | 3 | 3 | 3 | 56 | 9 | 6 | 6 | 5 |
| 21 | 5 | 4 | 2 | 2 | 57 | 8 | 7 | 5 | 5 |
| 22 | 6 | 3 | 3 | 3 | 58 | 9 | 6 | 6 | 5 |
| 23 | 6 | 3 | 3 | 3 | 59 | 9 | 6 | 6 | 5 |
| 24 | 6 | 4 | 4 | 4 | 60 | 9 | 6 | 6 | 5 |
| 25 | 6 | 4 | 4 | 4 | 61 | 9 | 6 | 6 | 6 |
| 26 | 6 | 4 | 4 | 4 | 62 | 9 | 6 | 6 | 5 |
| 27 | 6 | 4 | 4 | 4 | 63 | 9 | 7 | 6 | 6 |
| 28 | 6 | 4 | 2 | 2 | 64 | 9 | 7 | 6 | 5 |
| 29 | 7 | 4 | 4 | 4 | 65 | 9 | 7 | 5 | 5 |
| 30 | 7 | 4 | 4 | 4 | 66 | 10 | 6 | 6 | 6 |
| 31 | 6 | 5 | 5 | 3 | 67 | 10 | 6 | 6 | 6 |
| 32 | 7 | 4 | 4 | 4 | 68 | 10 | 6 | 6 | 6 |
| 33 | 7 | 4 | 4 | 4 | 69 | 10 | 6 | 6 | 6 |
| 34 | 7 | 4 | 4 | 4 | 70 | 10 | 7 | 7 | 6 |
| 35 | 7 | 5 | 5 | 5 | 71 | 10 | 7 | 7 | 5 |
| 36 | 7 | 5 | 5 | 4 | 72 | 10 | 7 | 7 | 5 |
| 37 | 7 | 5 | 5 | 5 | 73 | 9 | 8 | 8 | 8 |
| 38 | 8 | 4 | 4 | 4 | 74 | 10 | 7 | 7 | 5 |

FIG. 20

GENERATION METHOD FOR DISTRIBUTED CHANNEL HOPPING SYSTEM IN COGNITIVE RADIO NETWORKS

CROSS-REFERENCE TO RELATED APPLICATIONS

Pursuant to 35 U.S.C. § 119 and the Paris Convention Treaty, this application claims the benefit of Chinese Patent Application No. 201610231761.7 filed Apr. 14, 2016, the contents of which are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

This invention belongs to the field of telecomm a control information exchange mechanism based on channel hopping in cognitive radio networks (CRNs).

Description of the Related Art

Cognitive radio networks (CRNs) are facing an increasingly complex electromagnetic environment caused by the wide deployment of primary users (PUs) with small radio coverage, e.g., micro, pico, and femto cells. The availability of spectrum resources at each cognitive user (CU) may be agile due to the variation of PU occupancy, while the difference between the spectrum channels licensed to PUs may cause heterogeneous spectrum resources for the CUs under these PUs' coverage. Moreover, the ability for CUs to access multiple frequency channels also makes it difficult to resolve potential contentions among them. Thus, it is necessary for CUs to exchange a large amount of control information, such as local channel sensing result, time clock, network topology, and channel reservation, especially under distributed control.

To facilitate this exchange, many existing media access control (MAC) protocols rely on a common control channel (CCC), which is available for all CUs and free of PU occupancy. However, the chance for CUs with heterogeneous spectrum resources to establish such a CCC is normally very small. Moreover, the exchange of a large amount of control information may saturate the CCC and make it a bottleneck for the performance of CRNs. A more practical and efficient method then is for each CU to perform channel hopping (CH) among all accessible channels and exchange control information with its neighboring CUs when they rendezvous at a common channel free of PU occupation at the same time. Moreover, as different pairs of cognitive transmitter (CT) and cognitive receiver (CR) may rendezvous at different spectrum channels concurrently, the bottleneck for control information exchange can be mitigated effectively.

In a CRN under distributed control, because each CU may not know the information of its neighbors exactly and timely in most cases, it should independently generate its CH sequence according to a preset approach such that the rendezvous between any two CUs is always guaranteed in a blind fashion. Moreover, if all CUs, regardless of their roles as CTs or CRs, always follow a common approach to generate their CH sequences, the CH system, i.e., the group of all possible CH sequences so generated, will be called as a symmetric one. In contrast, if all CTs follow one approach to generate their CH sequences and all CRs the other approach, the CH system will qualify as an asymmetric one. In other words, the symmetric generation of CH sequences never relies on the priori knowledge of whether a generating CU is a CT or CR, while the asymmetric generation does. Because it is difficult to preset each CU as a fixed CT or CR in most applications, a symmetric CH system normally has a much wider variety of applications than an asymmetric one. For this reason, this invention concentrates on the design of symmetric CH systems for blind rendezvous among CUs.

To evaluate the performance of CH systems, the existing literatures mainly consider five types of metrics, i.e., degree of rendezvous (DoR), maximum time-to-rendezvous (MTTR), average time-to-rendezvous (ATTR), maximum conditional time-to-rendezvous (MCTTR), and channel loading (CL). Among them, the DoR records the number of spectrum channels at which two CUs can rendezvous, the MTTR or ATTR records the maximum or average time length, respectively, for two CUs to rendezvous given that all channels accessible by a CRN are free of PU occupancy, and the MCTTR the maximum time length for two CUs to rendezvous given that they share only one common channel free of PU occupancy. Finally, the CL of a CH system means the ratio between the maximum number of CH sequences, which can rendezvous at one channel concurrently, and the total number of CH sequences in the system. Obviously, to improve the robustness of control information exchange under PU interference, it is preferable for a CH system to have a large DoR. Meanwhile, the smaller the MTTR, ATTR, or MCTTR of a CH system, the shorter the transmission delay experienced by the CRN adopting it. Finally, as the CL characterizes the most serious congestion of control information exchange among CUs, a CH system should reduce its CL to mitigate the control channel saturation problem. In general, there exists a tradeoff between TTR metrics and CL of a CH system, i.e., the smaller the MTTR, ATTR, or MCTTR, the larger the CL, and vice versa. Thus one key problem for the design of symmetric CH systems is to minimize its MTTR, ATTR, or MCTTR for a given DoR or CL.

Table 1 summarizes the metrics of various symmetric CH systems for CRNs with or without a globally synchronized time clock. For symmetric synchronous CH systems, both SSCH and DH-MAC have a DoR of only 1 and are vulnerable to the interference from PUs. Based on the concept of relaxed cyclic difference set, or DS in short, both M-QCH and L-QCH afford the DoR of an arbitrary positive integer. To further improve the rendezvous efficiency, the RRICH and CACH based on the addition and multiplication in Galois fields were proposed. While these two CH systems can achieve the theoretical lower bound on the MTTR of symmetric synchronous CH systems for a given CL, their DoR has to be a prime power only. Moreover, the QLCH can achieve even shorter TTR metrics than the RRICH and CACH. However, it requires neighboring CUs to exchange such information as their CH sequences, IDs, and time clock offsets before the QLCH-based rendezvous process begins and hence cannot achieve blind rendezvous among CUs.

In practice, it is very challenging for CRNs to establish a globally synchronized time clock under distributed control. Thus more research efforts have been spent on the design of symmetric asynchronous CH systems. For example, the SARCH and A-QCH only have a DoR of 1 and 2, respectively. To achieve a DoR of arbitrary integer $N(\geq 1)$, the MACH is constructed by N mutually disjoint $(\alpha, \beta, \lambda)$-nonrelaxed difference sets, or NRDSs in short. However, as the existence of N mutually disjoint NRDSs for an arbitrary N(≥2) is still unknown, only two exemplified CH systems with N=2 and 8 were offered. The MACH with a DoR of N=8 can achieve the theoretical lower bound on the MTTR of symmetric asynchronous CH systems while that with a DoR of N=2 cannot. Similarly, the MtQS-DSrdv is constructed based on mutually disjoint quorums and NRDSs, of which the generation is also unknown in general. To remedy this, the DRDS was constructed with a DoR of arbitrary N (≥1) based on P mutually disjoint DSs, where P should be a prime not smaller than N, and a heuristic algorithm was designed to search these DSs. The main shortcoming of DRDS is that its MTTR $3P^2+2P$ is far beyond the optimum. Different from the different-set-based CH systems, both S-ACH and E-AHW are constructed by extending the ID sequences of all CUs. A common shortcoming of them is that, when the number of CUs becomes large, the required length of ID sequences will increase accordingly and so will their TTR metrics. In contrast, the JS, EJS, and CRSEQ avoid utilizing the ID sequences of CUs for the construction of CH systems with a DoR of arbitrary N(≥1). However, they work inefficiently when neighboring CUs have heterogeneous channel resources and hence are only suitable for a limited environment. To improve the rendezvous efficiency for CUs with heterogeneous spectrum resources, the ICH, HH, CBH, and SSS allow each CU to only hop among its locally available channels for blind rendezvous. These CH systems, however, suffer from various constraints of each CU, e.g., sensing ability, lack of other CUs' IDs, and the agility of channel availability.

In view of this, the present invention proposes a generation method for symmetric asynchronous and synchronous CH system, which can support CRNs with and without a synchronized time clock, respectively, to achieve blind rendezvous at an arbitrary number of spectrum channels.

SUMMARY OF THE INVENTION

This patent proposes two symmetric CH systems for supporting CRNs with and without a globally synchronized time clock to achieve blind rendezvous at an arbitrary number of spectrum channels. Both CH systems are constructed based on mutually disjoint relaxed cyclic difference sets over the set $Z_n$ of non-negative integers modulo n.

Mathematical Concepts

For the simplicity of further description, the mathematical concepts and related systems are firstly introduced as follows.

Definition 1. A k-element subset of $Z_n=\{0, 1, \ldots, n-1\}$ is called a relaxed cyclic (n, k)-difference set, or an (n, k)-DS in short, if every nonzero integer modulo n is the difference between certain two elements of this subset.

In general, when k approaches its lower bound $\sqrt{n}$ as much as possible, an (n, k)-DS is further called an (n, k)-minimal difference set or (n, k)-MDS in short.

Definition 2. Let A be a k-element set $\{a_0, a_1, \ldots, a_{k-1}\} \subseteq Z_n$. Then the rotation of A by the distance $i \in (0, n-1)$, denoted by ROT(A, i), means the set $\{a_0+i \bmod n, a_1+i \bmod n, \ldots, a_{k-1}+i \bmod n\}$. In particular, A=ROT(A, 0).

Corollary 1: If a k-element set $A \subseteq Z_n$ is an (n, k)-DS, so is the set ROT (A, i) i∈(0, n-1).

Definition 3. A cyclic quorum system, or a CQS in short, over $Z_n$ is a group of the n subsets $U_0, U_1, \ldots, U_{n-1}$ of $Z_n$, which satisfies the following two properties:
(1) $U_i \cap U_j \neq \emptyset$ i, j∈(0, n-1);
(2) $U_i$=ROT($U_0$, i) i∈(0, n-1).

Thus a CQS U should always satisfy the rotation closure property, i.e., i, j,h∈(0, n-1), ROT($U_i$, h)∩$U_j \neq \emptyset$.

Theorem 1. The group of n k-element sets A, ROT(A, 1), ..., ROT(A, n-1) qualifies as a CQS over $Z_n$ if and only if A is an (n, k)-DS.

Definition 4. An Mk-element subset of $Z_n$, where Mk≤n, is called a union of M disjoint (n, k)-DSs or an (M, n, k)-UDDS in short if it can be partitioned into M mutually disjoint k-element sets, each of which qualifies as an (n, k)-DS. In particular, when the M (n, k)-DSs partitioned from an (M, n, k)-UDDS are indeed MDSs, the UDDS is further called an (M, n, k)-UDMDS. Moreover, when M approaches its upper bound ⌊n/k⌋ as much as possible, an (M, n, k)-UDMDS is further called a maximal (M, n, k)-UDMDS.

Corollary 2. If an Mk-element set $U \subseteq Z_n$ is an (M, n, k)-UDDS or -UDMDS, so will be ROT(U, i) i∈(0, n-1).

Symmetric Synchronous CH System

The following procedure constructs a symmetric synchronous CH system with DoR=N based on an (M, n, k)-UDDS $U \subseteq Z_n$ subject to M≤N;

1. A symmetric asynchronous CH system comprises n periodic CH sequences such that each period of a CH sequence comprises exactly L frames and each frame comprises n timeslots. That is, each period of a CH sequence comprises nL timeslots, where L=N/gcd(M, N), M is a positive integer, N is a positive integer, M≤N, and gcd(M, N) denotes the greatest common divisor of M and N.

2. Label by 0, 1, 2, 3, ..., i, ..., n−1 the n periodic CH sequences in the constructed CH system, by $U_{i,0}, U_{i,1}, U_{i,2}, U_{i,3}, \ldots, U_{i,j}, \ldots, U_{i,M-1}$ the M mutually disjoint (n, k)-DSs partitioned from the (M, n, k)-UDDS ROT(U, i), by $t_{i,j,0}, t_{i,j,1}, t_{i,j,2}, t_{i,j,3}, \ldots, t_{i,j,d}, \ldots, t_{i,j,k-1}$ the k timeslots belonging to the (n,k)-DS $U_{i,j}$, by 0, 1, 2, 3, ..., j, ..., N−1 the N rendezvous channels, by 0, 1, 2, 3, ..., l, ..., L−1 the L frames in each period of a CH sequence, and by 0, 1, 2, 3, ..., i, ..., n−1 the n timeslots in each frame.

3. In each timeslot $t_{i,j,d} \in U_{i,j}$ of the frame l, the CH sequence i should hop to the channel (lM+j mod N). That is, when the CH sequences a and b are constructed based on the (M, n, k)-UDDSs ROT(U, a) and ROT(U, b), respectively, a, b∈(0, n-1), they will rendezvous at M different spectrum channels (lM mod N), (lM+1 mod N), ..., (lM+M−1 mod N) in the frame l, the total number of rendezvouses between the CH sequences a and b at all N channels in one period is not smaller than LM=MN/gcd(M, N), and the total number of rendezvouses between the CH sequences a and b at each channel in one period is not smaller than M/gcd(M, N), where l∈(0, L-1), i∈(0, n-1), j∈(0, M-1), $t_{i,j,d}$∈(0, n-1), l is the label of the L frames in one period of each CH sequence, a, b, and i represent the rotation distance applied to the (M, n, k)-UDDS U or the label of the CH sequence constructed based on one rotation of the (M, n, k)-UDDS U, a≠b, j is the label of the M mutually disjoint (n, k)-DSs partitioned from one rotation of the (M, n, k)-UDDS U or the label of the N rendezvous channels, and $t_{i,j,d}$ represents the label of the k timeslots belonging to one (n, k)-DS partitioned from one rotation of the (M, n, k)-UDDS U.

4. In each timeslot t∉$Z_n$\ROT(U, i) of the frame l, the CH sequence i should hop to an arbitrary channel h∉{0, 1, ..., N-1}.

Furthermore, M≥1.

The beneficial effects of the proposed symmetric synchronous CH system can be summarized as follows:

The n (n, k)-DSs $U_{i,j}$, ROT($U_{i,j}$, 1), ..., ROT($U_{i,j}$, n-1) j∈(0, M-1) should form a CQS over $Z_n$. By the rotation closure property of CQSs, whenever any two CH sequences a and b, where a, b∈(0, n-1), are activated synchronously, they should rendezvous at the channel (lM+j mod N) in a timeslot $t_{i,j,d} \in \text{ROT}(U_{i,j}, a) \cap \text{ROT}(U_{i,j}, b)$ of the frame g and the channel (lM+M+j mod N) in the same timeslot of the frame l+1, where $l \in (0, L-2)$. Meanwhile, the CH sequences a and b will rendezvous at M−1 different spectrum channels (lM+j+1 mod N), (lM+j+2 mod N) . . . (lM+M+j−1 mod N) between the said two rendezvouses. Thus the symmetric synchronous CH system has its MTTR and ATTR upper bounded by n−M+1 and n/M, respectively.

Because the CH sequences a and b can rendezvous at the channel (lM+j mod N) in the frame l, they will rendezvous at the same channel again in in the frame $l+\lfloor N/M \rfloor$ or $l+\lceil N/M \rceil$. Thus, if all N−1 channels other than (lM+j mod N) have been occupied by PUs, then the longest possible time interval between their two consecutive rendezvouses will occur when they rendezvous at the timeslot 0 of the frame l and the timeslot n−1 of the frame $l+\lceil N/M \rceil$. This implies that the MCTTR between any two CH sequences should be upper bounded by if $n\lceil N/M \rceil + n - 1$.

Let $U_{i,j} = \{u_0, u_1, \ldots, u_{k-1}\}$. Among $U_{i,j}$, $\text{ROT}(U_{i,j}, 2)$, . . . , $\text{ROT}(U_{i,j}, n-1)$, exactly k ones, i.e., $U_{i,j}$, $\text{ROT}(U_{i,j}, u_h - u_0 \mod n)$, $\text{ROT}(U_{i,j}, u_h - u_1 \mod n)$, . . . , $\text{ROT}(U_{i,j}, u_h - u_{h-1} \mod n)$, $\text{ROT}(U_{i,j}, u_h - u_{h+1} \mod n)$, . . . , $\text{ROT}(U_{i,j}, u_h - u_{k-1} \mod n)$ should share a common integer $u_h$ $h \in (0, k-1)$. This implies that, among the n CH sequences constructed by U, ROT(U, 1), . . . , ROT(U, n−1), exactly k ones will rendezvous at the channel (lM+j mod N) in the timeslot $u_h$ of the frame l. Thus the CL is k/n.

Finally, for a given parameter n, if the (M, n, k)-UDDS adopted for the construction of a symmetric synchronous CH system is indeed a maximal (M, n, k)-UDMDS, then the CL, MTTR, ATTR, and MCTTR of the constructed CH system will be minimized at the same time.

H

Symmetric Asynchronous CH System

The following procedure constructs a symmetric asynchronous CH system with DoR=N based on an (N, n, k)-UDDS $U \subseteq Z_n$.

1. An asynchronous CH system comprises n periodic CH sequences such that each period of a CH sequence comprises n timeslots.

2. Label by 0, 1, 2, 3, . . . , i, . . . , n−1 the n periodic CH sequences in the constructed CH system, by 0, 1, 2, 3, . . . , i, . . . , n−1 the n timeslots in each period, by $U_{i,0}$, $U_{i,1}$, $U_{i,2}$, $U_{i,3}$, . . . , $U_{i,j}$, . . . , $U_{i,N-1}$ the N mutually disjoint (n, k)-DSs partitioned from the (N, n, k)-UDDS ROT(U, i), by $t_{i,j,0}$, $t_{i,j,1}$, $t_{i,j,2}$, $t_{i,j,3}$, . . . , $t_{i,j,d}$, . . . , $t_{i,j,k-1}$ the k timeslots belonging to the (n, k)-DS $U_{i,j}$, and by 0, 1, 2, 3, . . . , j, . . . , N−1 the N rendezvous channels.

3. In each timeslot $t_{i,j,d} \in U_{i,j}$ of every period, the CH sequence i should hop to the channel j. That is, when the CH sequences a and b are constructed based on the (N, n, k)-UDDSs ROT(U, a) and ROT(U, b), respectively, a, b$\in$(0, n−1), no matter the difference value r between their starting timeslots, they will rendezvous at N different spectrum channels 0, 1, . . . , N−1 in each period, the total number of rendezvouses between the CH sequences a and b at all N channels in one period is not smaller than N, and the total number of rendezvouses between the CH sequences a and b at each channel in one period is not smaller than 1, the average time to rendezvous between the CH sequences a and b is not lager than n/N, where r can be any real number, $i \in (0, n-1)$, $j \in (0, N-1)$, $t_{i,j,d} \in (0, n-1)$, a, b, and i represent the rotation distances applied to the (N, n, k)-UDDS U or the labels of the CH sequence constructed based on one rotation of the (N, n, k)-UDDS U, a≠b, j is the label of the N mutually disjoint (n, k)-DSs partitioned from one rotation of the (N, n, k)-UDDS U or the label of the N rendezvous channels, and $t_{i,j,d}$ represents the label of the k timeslots belonging to the (n, k)-DS $U_{i,j}$ partitioned from the rotation of the (N, n, k)-UDDS U by the distance i.

4. In each timeslot to $t \notin Z_n \backslash \text{ROT}(U, i)$ of every period, the CH sequence i should hop to an arbitrary channel h$\notin$ $\{0, 1, \ldots, N-1\}$.

The beneficial effects of the proposed symmetric asynchronous CH system can be summarized as follows:

The n (n, k)-DSs $U_{i,j}$, $\text{ROT}(U_{i,j}, 1)$, . . . , $\text{ROT}(U_{i,j}, n-1)$ j $\in$(0, N−1) should form a CQS over $Z_n$. By the rotational closure property of CQSs, no matter the difference value r between their starting timeslots, any two CH sequences a and b constructed by ROT(U, a) and ROT(U, b), respectively, can always rendezvous at the channel j at each timeslot t$\in$ $\text{ROT}(U_{i,j}, a+r \mod n) \cap \text{ROT}(U_{i,j}, b)$ in a period, where a, b$\in$(0, n−1) and r can be any real number. This implies that they can always rendezvous at each of the N channels labeled by 0, 1, . . . , N−1 for at least one time in each period and the average time interval between their two consecutive rendezvouses will be upper bounded by n/N. Thus the symmetric asynchronous CH system has a DoR of N and its MTTR upper bounded by n/N.

Meanwhile, if the two CH sequences a and b only rendezvous N times in every period and these rendezvouses occur at the N timeslots labeled by 0, n−N+1, n−N+2, . . . , n−1 of the period, then the two consecutive rendezvouses at the timeslots 0 and n−N+1 will yield a maximal time delay of n−N+1 timeslots. Thus the symmetric asynchronous CH system has its MTTR upper bounded by n−N+1.

Moreover, when only one among the N rendezvous channels is free of PU occupancy, then the two CH sequences a and b can still rendezvous at this unique available channel in the same timeslot of two consecutive periods. This implies that MCTTR between any two CH sequences should be upper bounded by n.

By the same derivation for the symmetric synchronous CH system in this invention, the symmetric asynchronous CH system has a CL of k/n.

Finally, for a given parameter n, if the (N, n, k)-UDDS adopted for the construction of a symmetric asynchronous CH system is indeed a maximal (N, n, k)-UDMS, then the CL, MTTR, ATTR, and MCTTR of the constructed CH system will be minimized at the same time.

The exhaustive-search-based generation of a maximal UDMDS

The exhaustive-search-based generation of a maximal (M, n, k)-UDMDS over $Z_n$ can be divided into the following two steps:

1. Generate all possible (n, k)-MDSs.

2. Search a maximal number of M mutually disjoint (n, k)-MDSs from all possible (n, k)-MDSs.

The exhaustive-search-based generation of all possible (n, k)-MDSs

For a given n≥3, the following procedure can generate a set $\Omega$ of all possible (n, k)-MDSs, where the set S includes the h elements $s_0, s_1, \ldots, s_{h-1}$ of $Z_n$, h$\in$(2, k), which have been selected for the generation of (n, k)-MDSs, the set D includes all difference vales provided by S, and the set $\Phi_1$ or $\Phi_2$ includes all candidate integers or 2-tuples, respectively, each of which can be inserted into S for providing a new difference value d $\notin$ D.

1. Initialize $\Omega = \emptyset$, S=$\{0,1\}$, and D=$\{1, n-1\}$.

2. If k=2, then set $\Omega$=S; else, if k≥3, then call the function Search MDS(D, S) to update the set $\Omega$.

3. For each w$\in\Omega$, a update $\Omega = \Omega \cup \{\text{ROT}(w, 1)\} \cup \{\text{ROT}(w, 2)\} \cup \ldots \cup \{\text{ROT}(w, n-1)\}$.

4. Output the set $\Omega$ of (n, k)-MDSs.
Function Search_MDS(D, S)

```
{
    Let h=|S| and randomly choose d∈{1, 2, ... , n-1}\D;
    Let Φ₁={s₀+d mod n, s₀-d mod n,
        s₁+d mod n, s₁-d mod n, ... , s_{h+1}+d mod n, s_{h-1}-d mod n};
    For each u∈Φ₁,
    {
        Let D*=D∪{u-s₀ mod n, u-s₁ mod n, ... , u-s_{h-1} mod n,
            s₀-u mod n, s₁- u mod n, ... , s_{h-1}-u mod n};
        Let S*=S∪{u};
        If h=k-1, then
            If D*={1, 2, .. , n-1}, then
                Update Ω=Ω∪{S*};
        Else,
            Call the function Search_MDS(D*, S*);
    }
    If h≤k-2, then
    {
        Let the set Φ₂ be composed of all 2-tuples (v, w) subject to
            v∈Z_n\S, w∈Z_n\S, and w=v+d mod n;
        For each 2-tuple (v, w) in Φ₂,
        {
            Let D*=D∪{d, n-d mod n, v-s₀ mod n, v-s₁ mod n, ... ,
                v-s_{h-1} mod n, w-s₀, w-s₁ mod n, ... , w-s_{h-1} mod n,
                s₀-v mod n, s₁-v mod n, ... , s_{h-1}-v mod n, s₀-w mod n,
                s₁-w mod n, ... , s_{h-1}-w mod n};
            Let S*=S∪{v, w};
            If h=k-2, then
                If D*={1, 2, ... , n-1}, then
                    Update Ω=Ω∪{S*};
            Else,
                Call the function Search_MDS(D*, S*);
        }
    }
}
```

The beneficial effects of the exhaustive-search-based generation for all possible (n, k)-MDSs can be summarized as follows:

This generation can find all possible (n, k)-MDSs by exhaustively searching a number of k-element subsets of $Z_n$ at the order of $O(k^{k-2})$. In contrast, An intuitive solution for the generation of all possible (n, k)-MDSs is to exhaustively search all $C_n^k$ k-element subsets of $Z_n$. As (n, k)-MDSs have k approach $n^{0.5}$ as much as possible, the exhaustive-search-based generation method is more efficient than the intuitive solution.

Moreover, as the rotation of an (n, k)-MDS by any distance $r \in (1, n-1)$ should also be an (n, k)-MDS and $\Omega$ should contain all possible (n, k)-MDSs, the size of $\Omega$, i.e., $|\Omega|$ should be a multiple of n and all $|\Omega|$ (n, k)-MDSs in $\Omega$ can be divided into $(|\Omega|/n)$ different CQSs, each comprising exactly n (n, k)-MDSs.

Exhaustive search for a maximal number of mutually disjoint (n, k)-MDSs

Given a set $\Omega$ of all possible (n, k)-MDSs, which can be partitioned into $Q=|\Omega|/n$ different CQSs, i.e., $CQS_0$, $CQS_1$, $CQS_{Q-1}$, the following procedure generates a set $\Psi$ of mutually disjoint (n, k)-MDSs:

1. Initialize i=0 and the set $\Psi=\Psi^*=\emptyset$.
2. If i=Q, then output the mutually disjoint (n, k)-MDSs in $\Psi$; else, randomly choose one (n, k)-MDS $w_i \in CQS_i$, initialize $\Psi^*=\Psi\setminus\{w_i\}$, and update $\Omega^*$ by eliminating its (n, k)-MDSs that overlap with $w_i$.
3. Find a maximal number of mutually disjoint {n, k}-MDSs from $\Psi^*$ via exhaustively search and update $\Psi^*$ as the group of these MDSs.
4. If $|\Psi^*|=\lfloor n/k \rfloor-1$, then output $\Psi=\Psi^*\cup\{w_i\}$ and end the procedure; else if $|\Psi^*|\geq \Psi$, then update $\Psi=\Psi^*\cup\{w_i\}$, set i=i+1 and return to 2.

The beneficial effects of the exhaustive search for a maximal number of mutually disjoint (n, k)-MDSs can be summarized as follows:

This search method can always find a maximal number of mutually disjoint MDSs from the set $\Psi$ of all possible (n, k)-MDSs by searching a total number of (n, k)-MDSs at the order of $$O\left(\varrho^{\lfloor\frac{n}{k}\rfloor}\left(n-\frac{1}{2}k^2\right)^{\lfloor\frac{n}{k}\rfloor-1}\right).$$

In contrast, an intuitive solution for the same purpose is to search $$O\left(C_{|\Omega|}^{\lfloor\frac{n}{k}\rfloor}\right)$$

(n, k)-MDSs from the set $\Omega$. Thus the proposed search method is more efficient than the intuitive solution.

The heuristic generation of (n, k)-MDSs

When n becomes large, the exhaustive-search-based generation of all possible (n, k)-MDSs will incur unaffordable complexity. To remedy this, below develops a low-complexity heuristic approach for generating a set $\Omega$ of (n, k)-MDSs from an (n, k)-MDS $A=\{0, 1, a_2, a_3, \ldots, a_{k-1}\} \subseteq Z_n$.

1. Initialize the sets $\Omega=\Psi=\emptyset$;
2. For each mutual prime $\lambda \in (1, n-1)$ of n, update $\Omega$ as the set $\Omega\cup\{\lambda\cdot A\} \cup \{ROT(\lambda\cdot A, 1)\} \cup\{ROT(\lambda\cdot A, 2)\} \cup \ldots \cup\{ROT(\lambda\cdot A, n-1)\}$, where $\lambda\cdot A$ denotes the set $\{\lambda a_0 \bmod n, \lambda a_1 \bmod n, \ldots, \lambda a_{k-1} \bmod n\} \subseteq Z_n$.
3. For each $i\in(2, k-1)$ and each $j\in Z_n\setminus A$, replace $a_i \subset A$ by the integer j for generating a new set $A_{i,j}$ and update $\Psi=\Psi\cup\{A_{i,j}\}$ only when $A_{i,j}$ qualifies as an (n, k)-MDS and does not belong to $\Omega$.
4. For any two integers $u \neq v \subset (2, k-1)$ and each 2-tuple (w, z) in $Z_n\setminus A$ subject to $z-w=a_v a_u \bmod n$, replace $a_u$ and $a_v$ in A by the integers w and z, respectively, for generating a new set $A_{(u,v),(w,z)}$ and update $\Psi=\Psi\cup\{A_{(u,v),(w,z)}\}$ only when $A_{(u,v),(w,z)}$ qualifies as an (n, k)-MDS and does not belong to $\Omega$.
5. For each (n, k)-MDS $\psi \subset \Psi$, set $A=\psi$ and call 2 to add more (n, k)-MDSs into the set $\Omega$.

The beneficial effects for this heuristic generation of (n, k)-MDSs can be summarized as follows:

This generation method is based on the fact that, if a k-element set $A=\{a_0, a_1, \ldots, a_{k-1}\} \subseteq Z_n$ is an (n, k)-MDS and $\lambda \in (1, n-1)$ is a mutual prime of n, then the set $\lambda\cdot A=\{\lambda a_0 \bmod n, \lambda a_1 \bmod n, \ldots, \lambda a_{k-1} \bmod n\} \subseteq Z_n$ will also be an (n, k)-MDS. It only needs to search at most $(C_{k-2}^2+k-2)(n-k)$ k-element subsets of $Z_n$, which is at the order of $O(k^4)$ because of $n \approx k^2$, and hence incurs a much lower complexity than the exhaustive-search-based generation for all possible (n, k)-MDSs. However, the shortcoming of this heuristic generation method is that it cannot yield all possible (n, k)-MDSs in most time.

BRIEF DESCRIPTION OF THE DRAWINGS

FIG. 1 depicts the proposed symmetric synchronous CH system with DoR=3 constructed based on a (2, 6, 3)-UD-MDS, which can be partitioned into 2 disjoint (6, 3)-MDSs $\{0, 1, 3\} \subseteq Z_6$ and $\{2, 4, 5\} \subseteq Z_6$.

FIG. 2 depicts the proposed symmetric synchronous CH system with DoR=3 constructed based on a (2, 7, 3)-UDDS, which can be partitioned into 2 disjoint (7, 3)-MDSs {1, 2, 4}⊆$Z_7$ and {3, 5, 6}⊆$Z_7$, where h ∉ {0, 1, 2}.

FIG. 3 depicts the existing M-QCH with DoR=3 constructed based on a (3, 2)-MDS, where h ∉ {0, 1, 2}.

FIG. 4 depicts the existing L-QCH with DoR=3 constructed based on a (7, 3)-MDS, where h ∉ {0, 1, 2}.

FIG. 5 depicts the existing RRICH with DoR=3.

FIG. 6 depicts the existing CACH with DoR=3 and u=2.

FIG. 13 depicts the proposed symmetric asynchronous CH system with DoR=3 constructed based on a (3, 15, 5)-UDMDS, which can be partitioned into 3 disjoint (15, 5)-MDSs {0, 1, 2, 6, 9} ⊆$Z_{15}$, {3, 4, 5, 8, 11} ⊆$Z_{15}$, and {7, 10, 12, 13, 14} ⊆$Z_{15}$.

FIG. 20 depicts the number of mutually disjoint (n, k)-MDSs generated by the exhaustive-search-based and heuristic-search-based methods when n⊂ (3, 74).

DETAILED DESCRIPTION OF THE EMBODIMENTS

Figure 7:
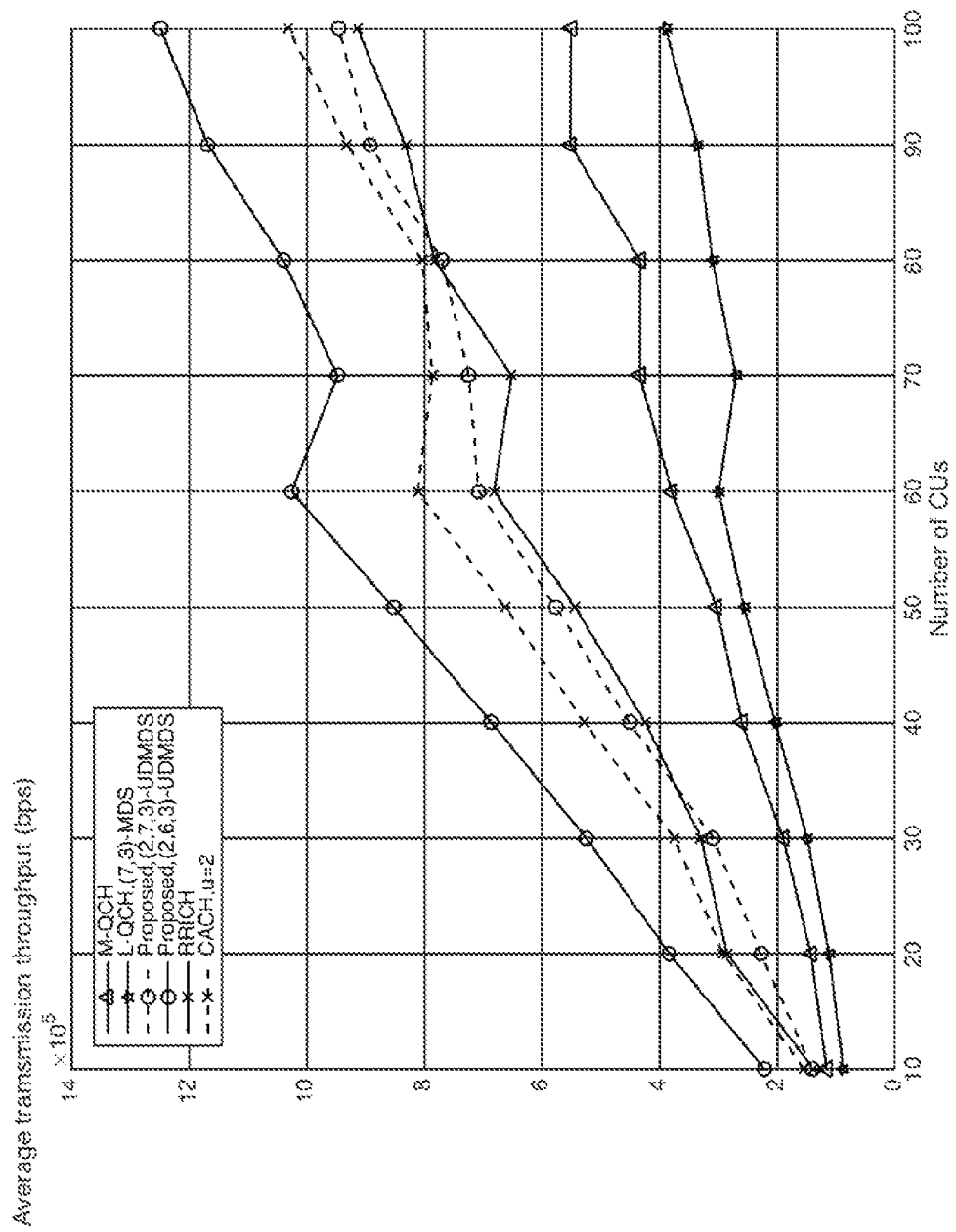
FIG. 7 depicts the average transmission throughput versus the number of CUs under the proposed symmetric synchronous CH systems based on (2, 6, 3)- and (2, 7, 3)-UDMDS, the existing M-QCH, the existing L-QCH based on (7, 3)-MDS, the existing RRICH, and the existing CACH with u=2.
Figure 8:
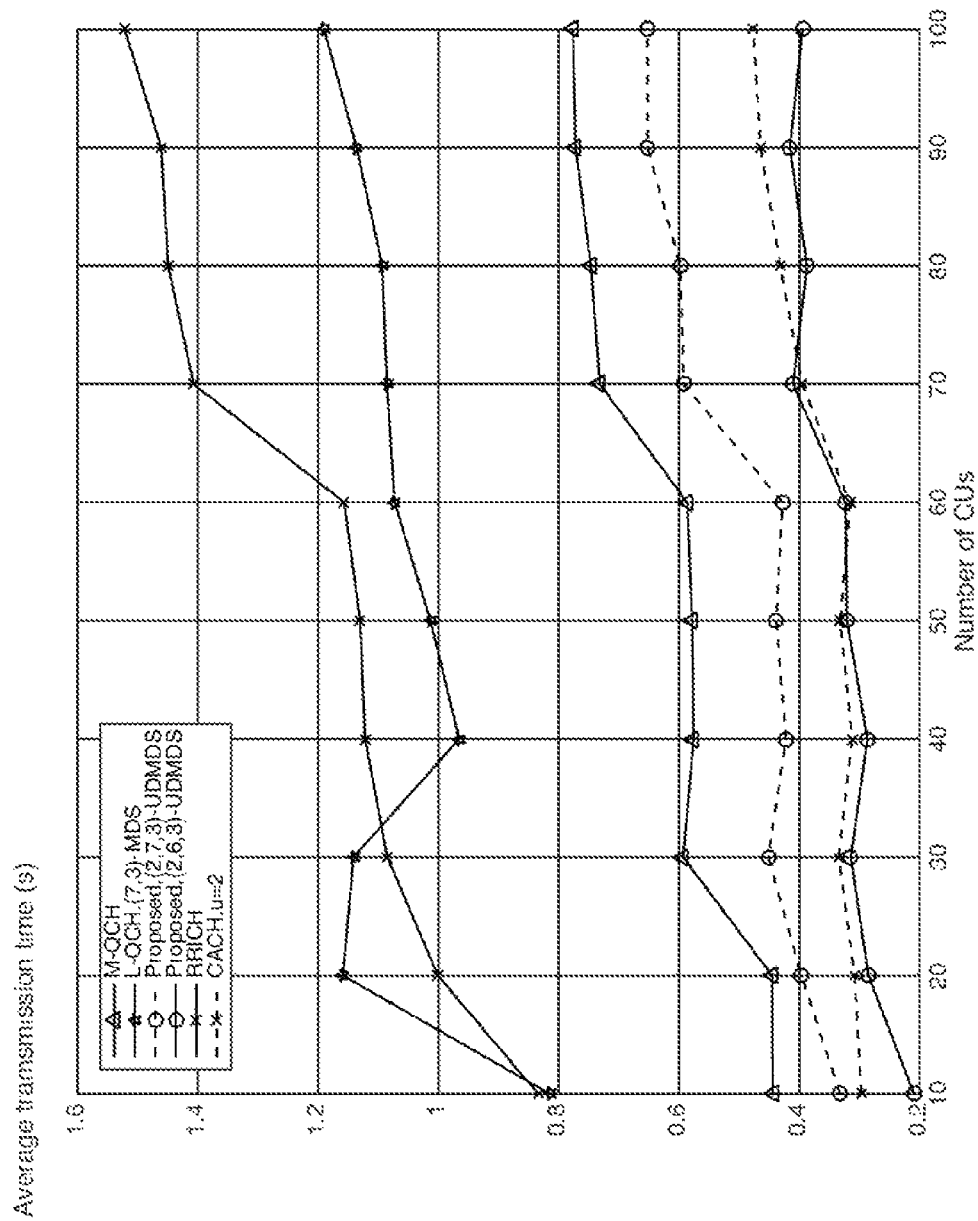
FIG. 8 depicts the average transmission time versus the number of CUs under the proposed symmetric synchronous CH systems based on (2, 6, 3)- and (2, 7, 3)-UDMDS, the existing M-QCH, the existing L-QCH based on (7, 3)-MDS, the existing RRICH, and the existing CACH with u=2.
Figure 9:
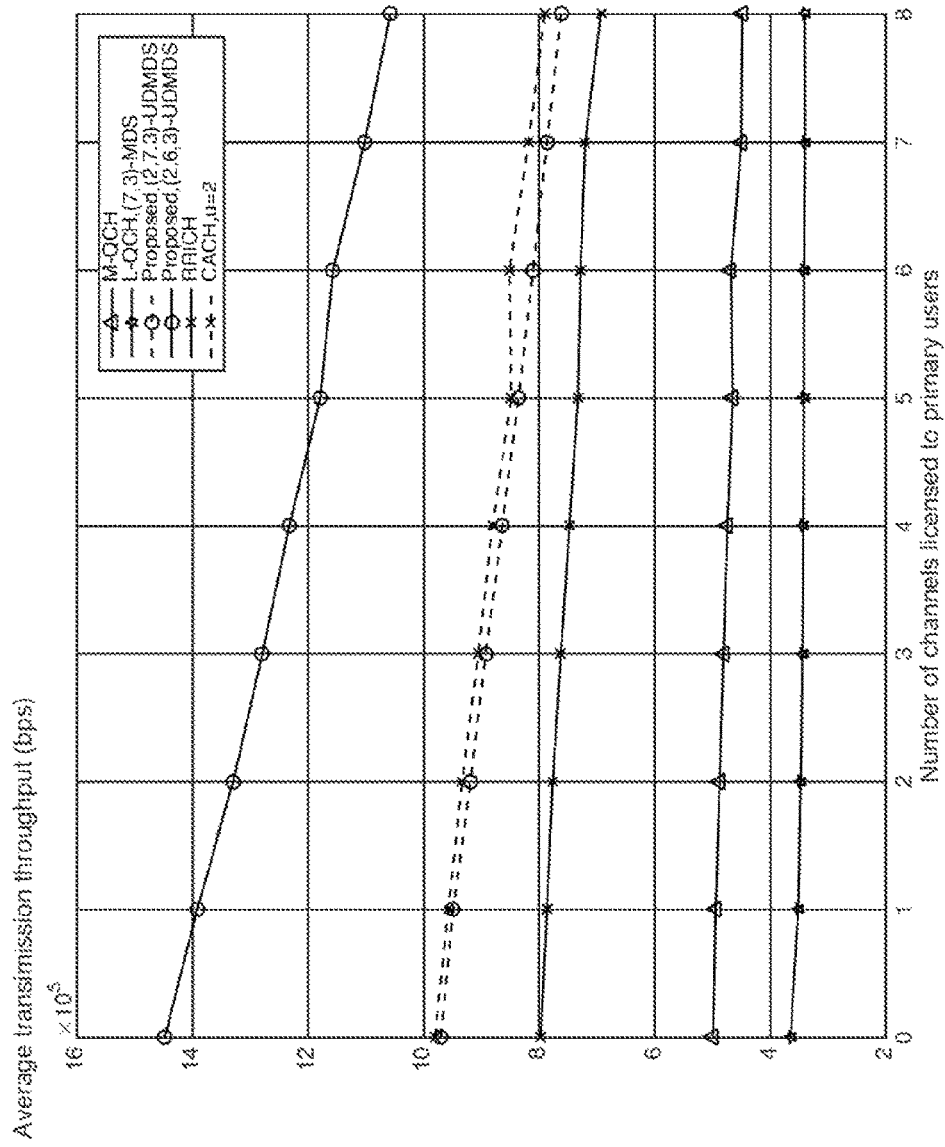
FIG. 9 depicts the average transmission throughput versus the number of channels licensed to PUs under the proposed symmetric synchronous CH systems based on (2, 6, 3)- and (2, 7, 3)-UDMDS, the existing M-QCH, the existing L-QCH based on (7, 3)-MDS, the existing RRICH, and the existing CACH with u=2.
Figure 10:
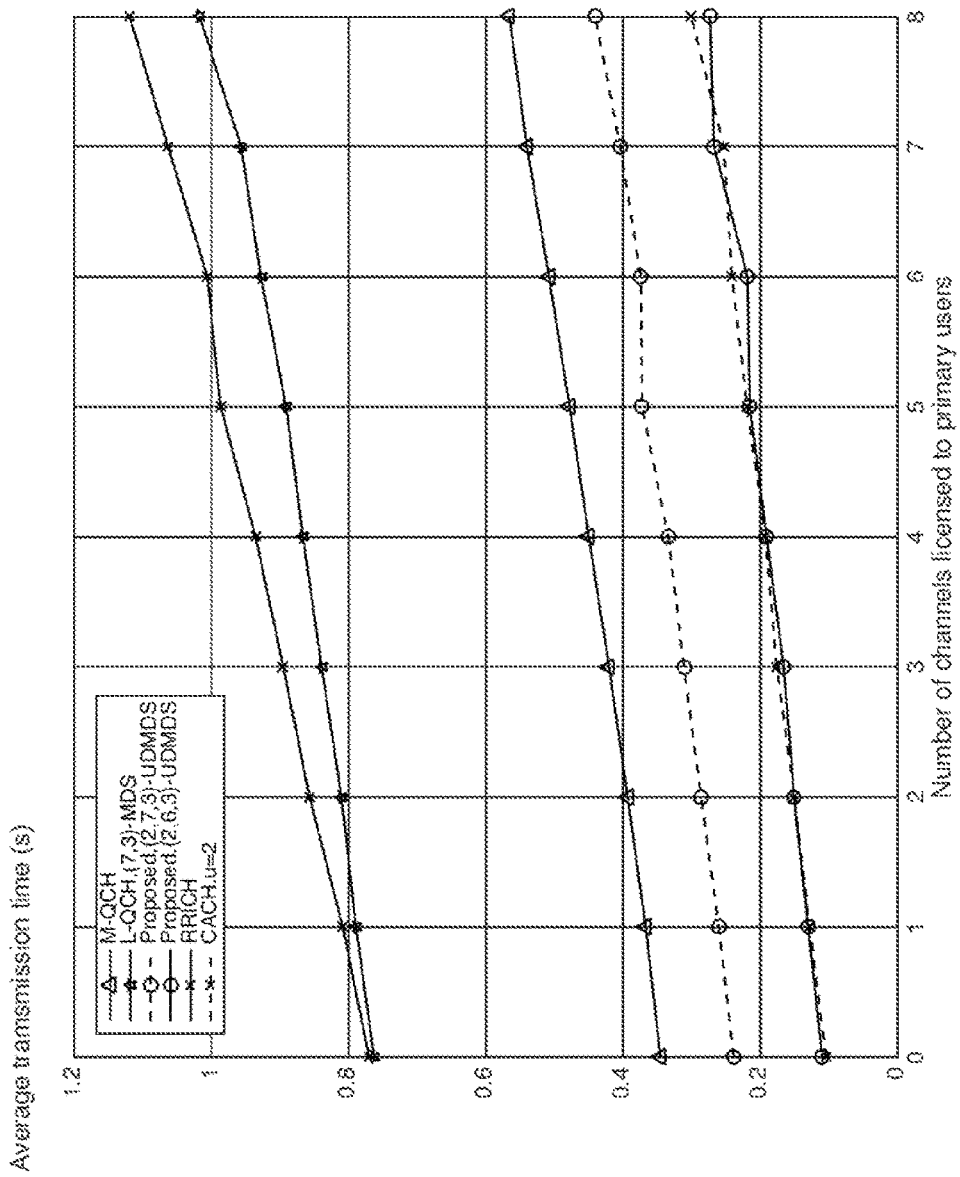
FIG. 10 depicts the average transmission time versus the number of channels licensed to PUs under the proposed symmetric synchronous CH systems based on (2, 6, 3)- and (2, 7, 3)-UDMDS, the existing M-QCH, the existing L-QCH based on (7, 3)-MDS, the existing RRICH, and the existing CACH with u=2.
Figure 11:
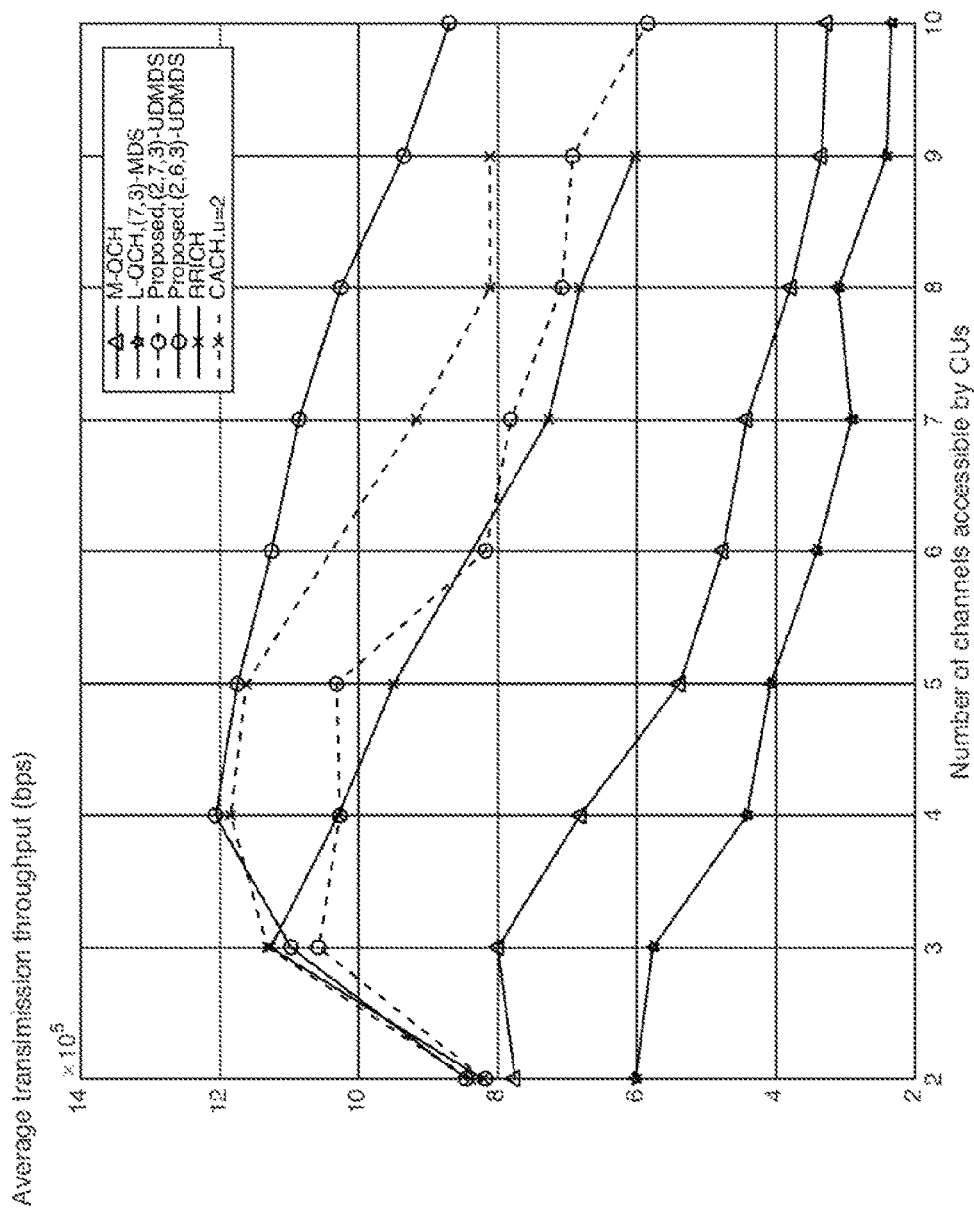
FIG. 11 depicts the average transmission throughput versus the number of channels accessible by CUs under the proposed symmetric synchronous CH systems based on (2, 6, 3)- and (2, 7, 3)-UDMDS, the existing M-QCH, the existing L-QCH based on (7, 3)-MDS, the existing RRICH, and the existing CACH with u=2.
Figure 12:
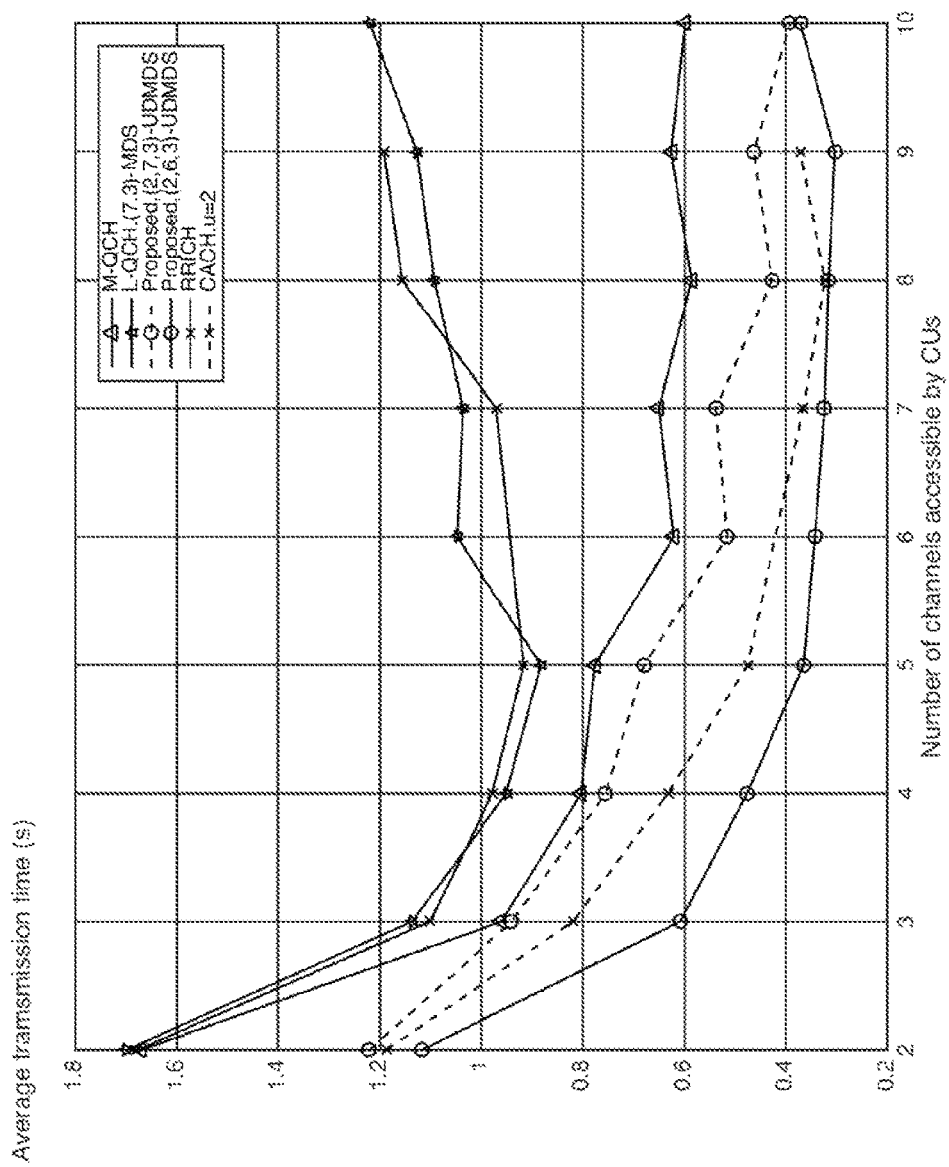
FIG. 12 depicts the average transmission time versus the number of channels accessible by CUs under the proposed symmetric synchronous CH systems based on (2, 6, 3)- and (2, 7, 3)-UDMDS, the existing M-QCH, the existing L-QCH based on (7, 3)-MDS, the existing RRICH, and the existing CACH with u=2.
Figure 14:
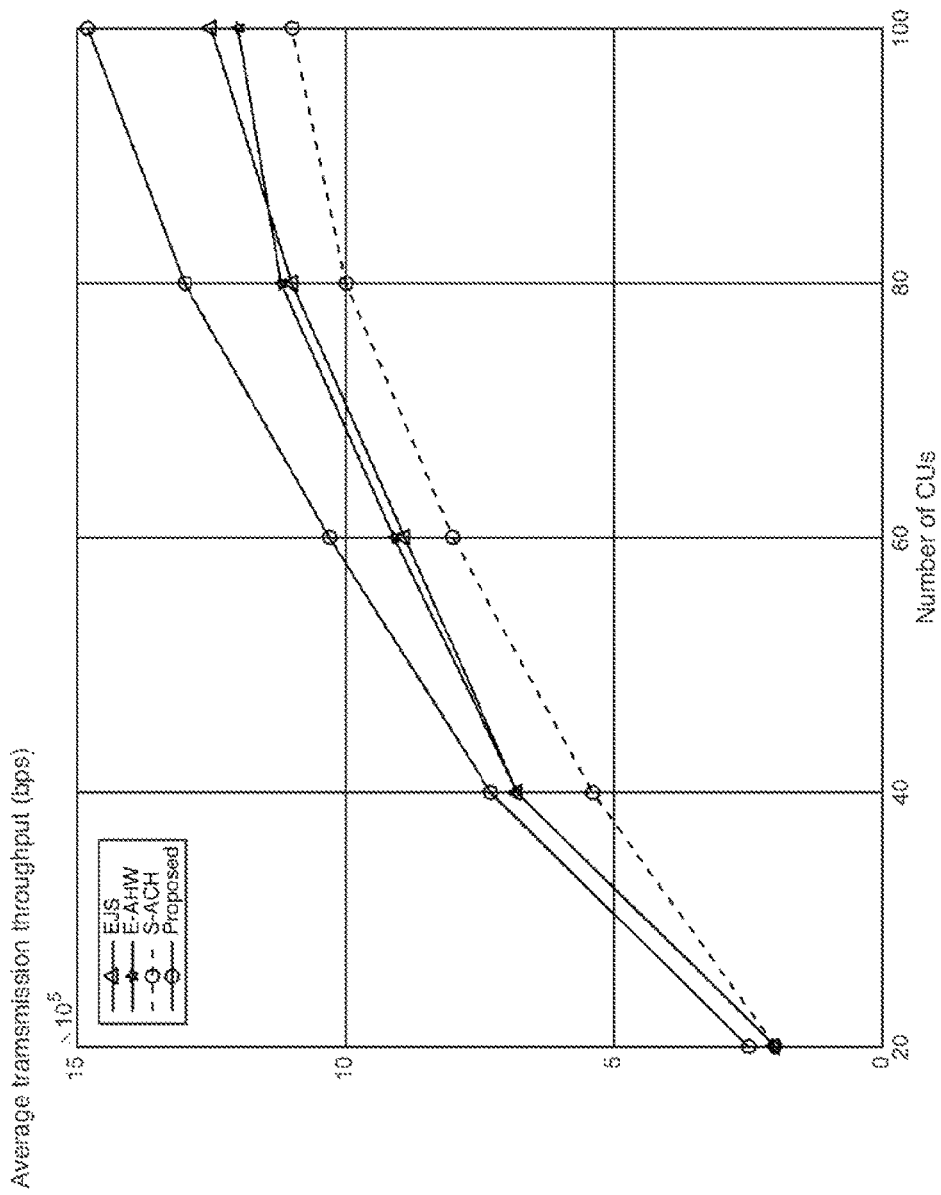
FIG. 14 depicts the average transmission throughput versus the number of CUs under the proposed symmetric asynchronous CH system and the existing EJS, S-ACH, and E-AHW.
Figure 15:
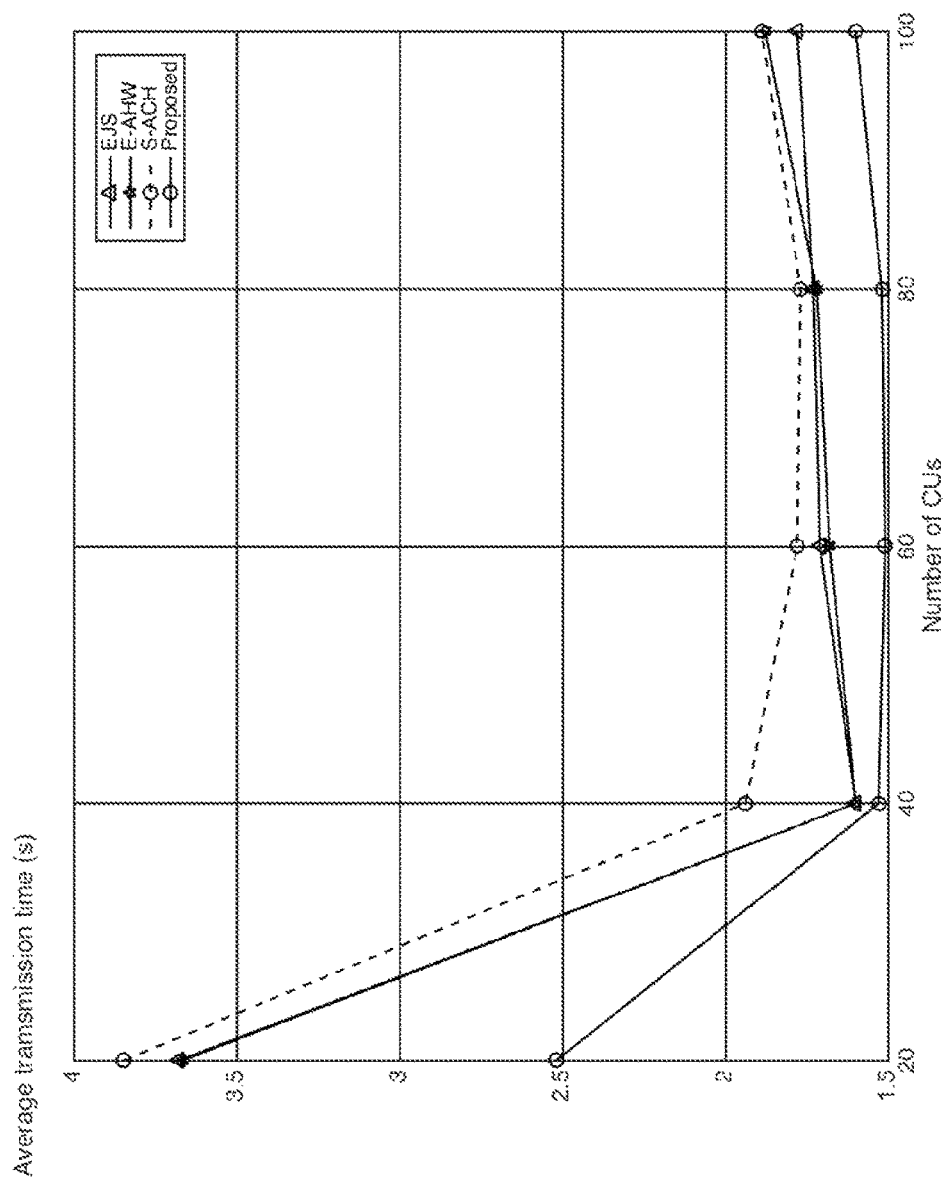
FIG. 15 depicts the average transmission time versus the number of CUs under the proposed symmetric asynchronous CH system and the existing EJS, S-ACH, and E-AHW.
Figure 16:
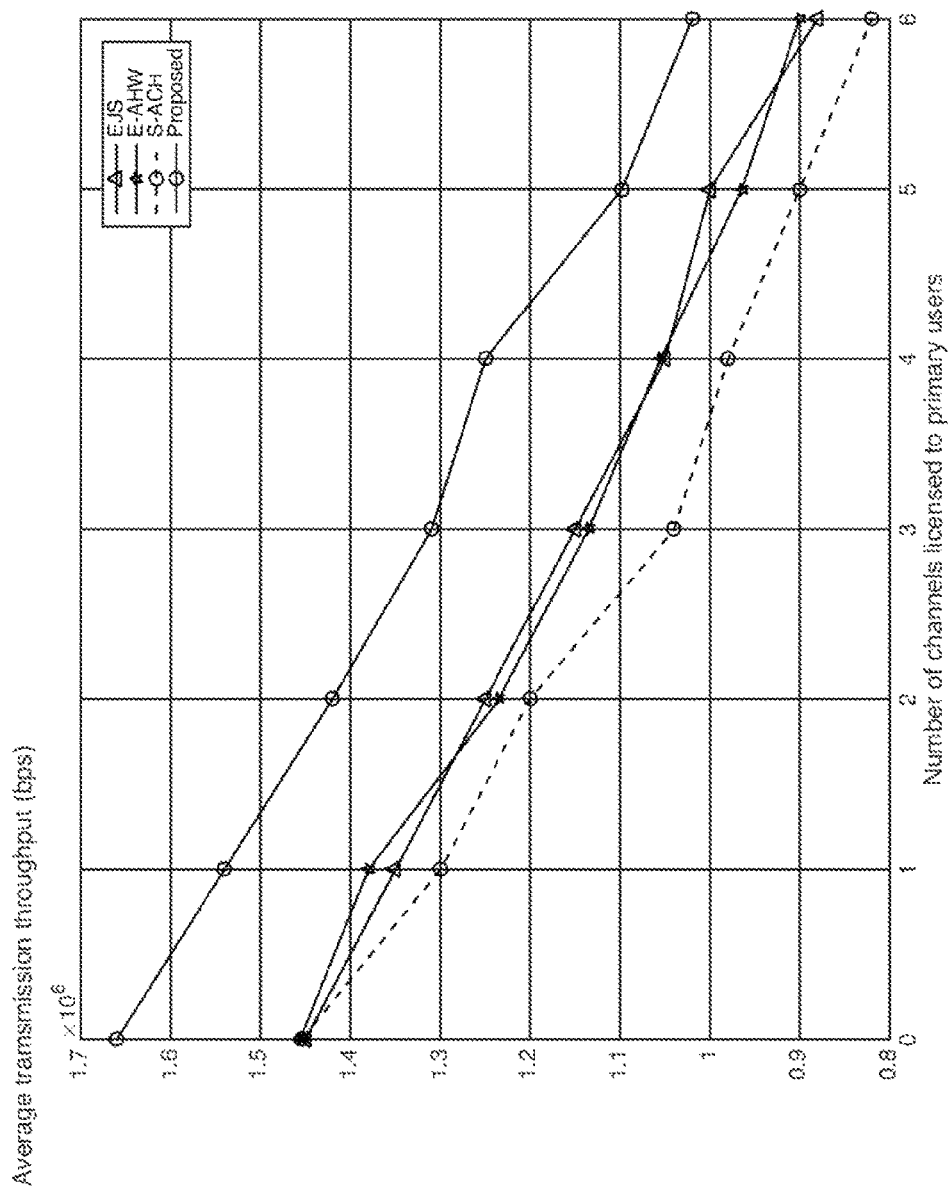
FIG. 16 depicts the average transmission throughput versus the number of channels licensed to PUs under the proposed symmetric asynchronous CH system and the existing EJS, S-ACH, and E-AHW.
Figure 17:
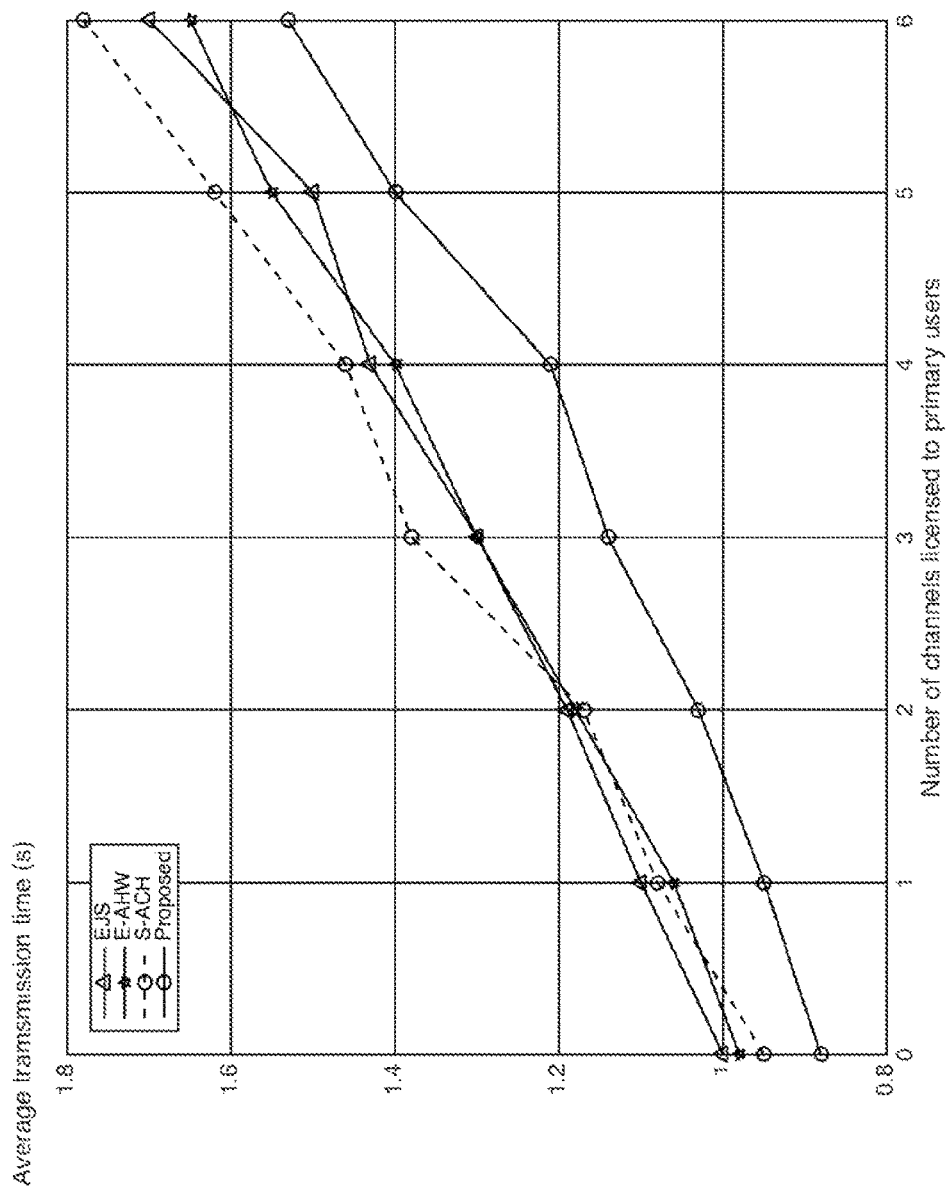
FIG. 17 depicts the average transmission time versus the number of channels licensed to PUs under the proposed symmetric asynchronous CH system and the existing EJS, S-ACH, and E-AHW.
Figure 18:
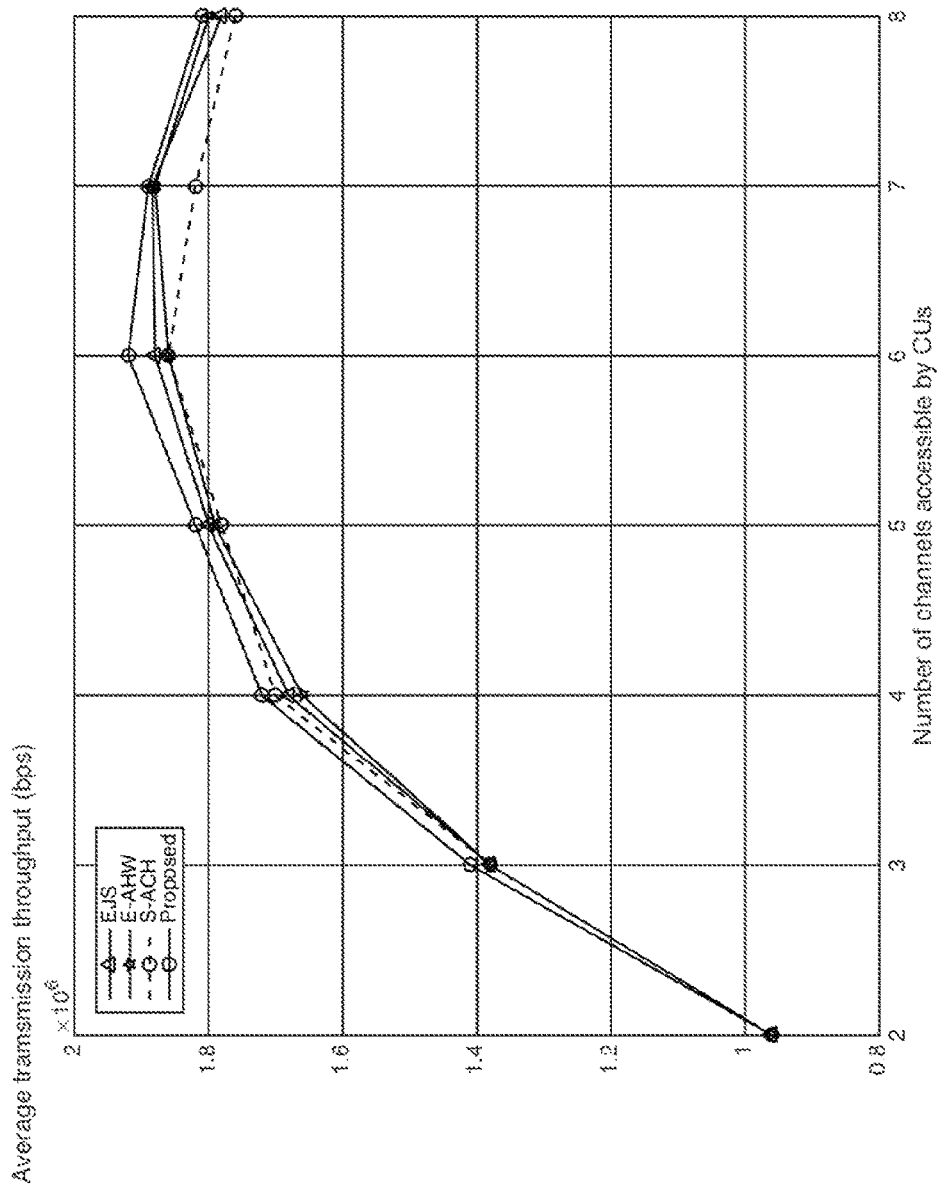
FIG. 18 depicts the average transmission throughput versus the number of channels accessible by CUs under the proposed symmetric asynchronous CH system and the existing EJS, S-ACH, and E-AHW.
Figure 19:
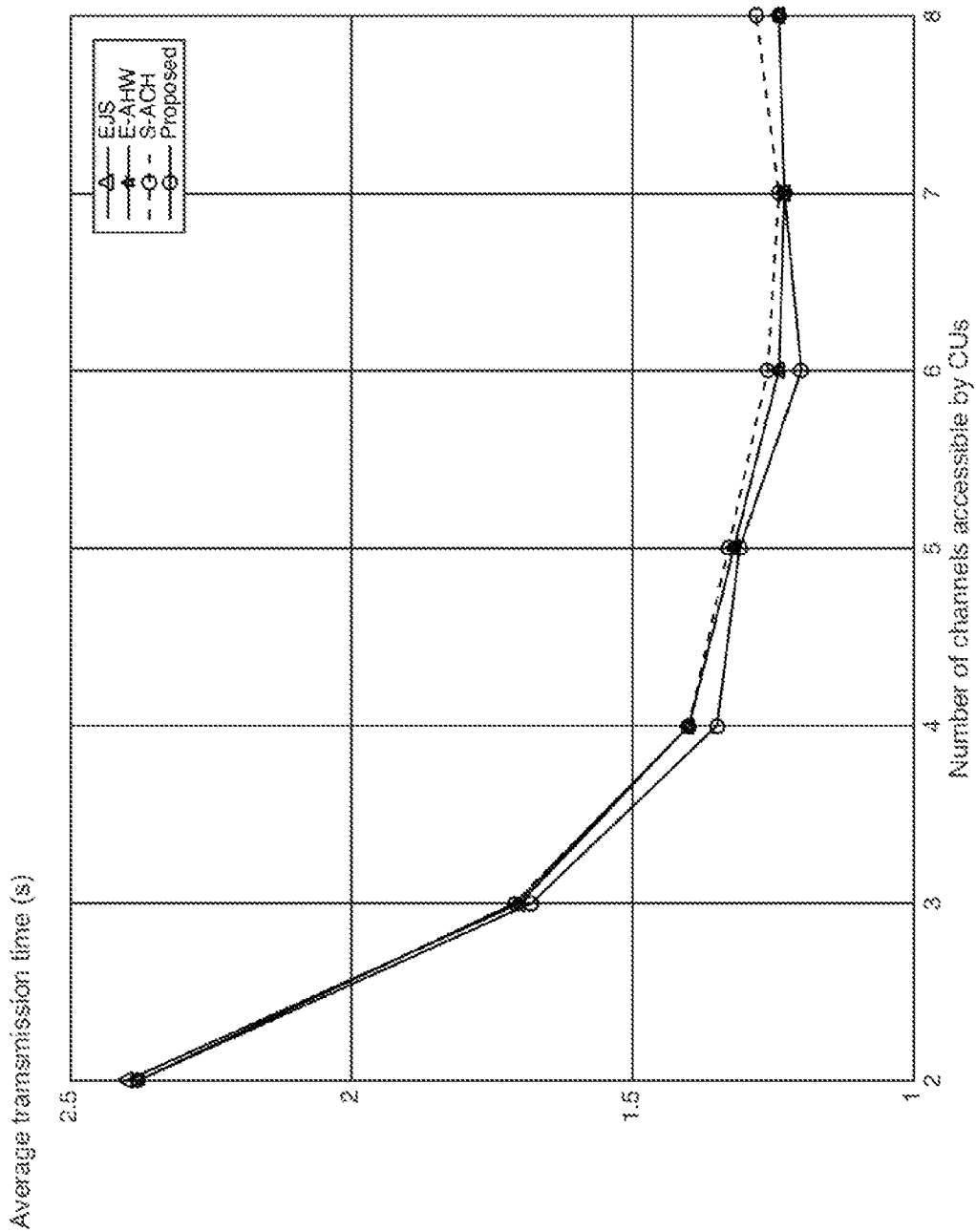
FIG. 19 depicts the average transmission time versus the number of channels accessible by CUs under the proposed symmetric asynchronous CH system and the existing EJS, S-ACH, and E-AHW.

Below we shall explain the detailed implementation examples of symmetric synchronous and asynchronous CH systems as well as the exhaustive- and heuristic-search-based generation of UDMDSs.

Example of the proposed symmetric synchronous CH systems

A symmetric synchronous CH system with DoR=N can be constructed based on an (M, n, k)-UDDS U ⊆$Z_n$ subject to M≤N as follows.

1. A symmetric asynchronous CH system comprises n periodic CH sequences such that each period of a CH sequence comprises exactly L frames and each frame comprises n timeslots. That is, each period of a CH sequence comprises nL timeslots, where L=N/gcd (M, N), M is a positive integer, N is a positive integer, M≤N, and gcd(M, N) denotes the greatest common divisor of M and N.

2. Label by 0, 1, 2, 3, . . . , i, n−1 the n periodic CH sequences in the constructed CH system, by $U_{i,0}$, $U_{i,1}$, $U_{i,2}$, $U_{i,3}$, . . . , $U_{i,j}$, . . . , $U_{i,M-1}$ the M mutually disjoint (n, k)-DSs partitioned from the (M, n, k)-UDDS ROT(U, i), by $t_{i,j,0}$, $t_{i,j,1}$, $t_{i,j,2}$, $t_{i,j,3}$, . . . , $t_{i,j,d}$, . . . , $t_{i,j,k-1}$ the k timeslots belonging to the (n−k)-DS $U_{i,j}$, by 0, 1, 2, 3, . . . , N−1 the N rendezvous channels, by 0, 1, 2, 3, . . . , l, . . . , L−1 the L frames in each period of a CH sequence, and by 0, 1, 2, 3, . . . , i, n−1 the n timeslots in each frame.

3. In each timeslot $t_{i,j,d}$∈$U_{i,j}$ of the frame l, the CH sequence i should hop to the channel (lM+j mod N). That is, when the CH sequences a and b are constructed based on the (M, n, k)-UDDSs ROT(U, a) and ROT(U, b), respectively, a, b∈(0, n−1), they will rendezvous at M different spectrum channels (lM mod N), (lM+1 mod N), . . . , (lM+M−1 mod N) in the frame l, the total number of rendezvouses between the CH sequences a and b at all N channels in one period is not smaller than LM=MN/gcd(M, N), and the total number of rendezvouses between the CH sequences a and b at each channel in one period is not smaller than M/gcd(M, N), where l∈(0, L−1), i∈(0, n−1), j∈(0, M−1), $t_{j,d}$∈(0, n−1), l is the label of the L frames in one period of each CH sequence, a, b, and i represent the rotation distance applied to the (M, n, k)-UDDS U or the label of the CH sequence constructed based on one rotation of the (M, n, k)-UDDS U, a≠b, j is the label of the M mutually disjoint (n, k)-DSs partitioned from one rotation of the (M, n, k)-UDDS U, and $t_{i,j,d}$ represents the label of the k timeslots belonging to one (n, k)-DS partitioned from one rotation of the (M, n, k)-UDDS U.

4. In each timeslot to t∉ $Z_n$\ROT(U, i) of the frame l, the CH sequence i should hop to an arbitrary channel h∉ {0, 1, . . . , N−1}.

Figure 1:
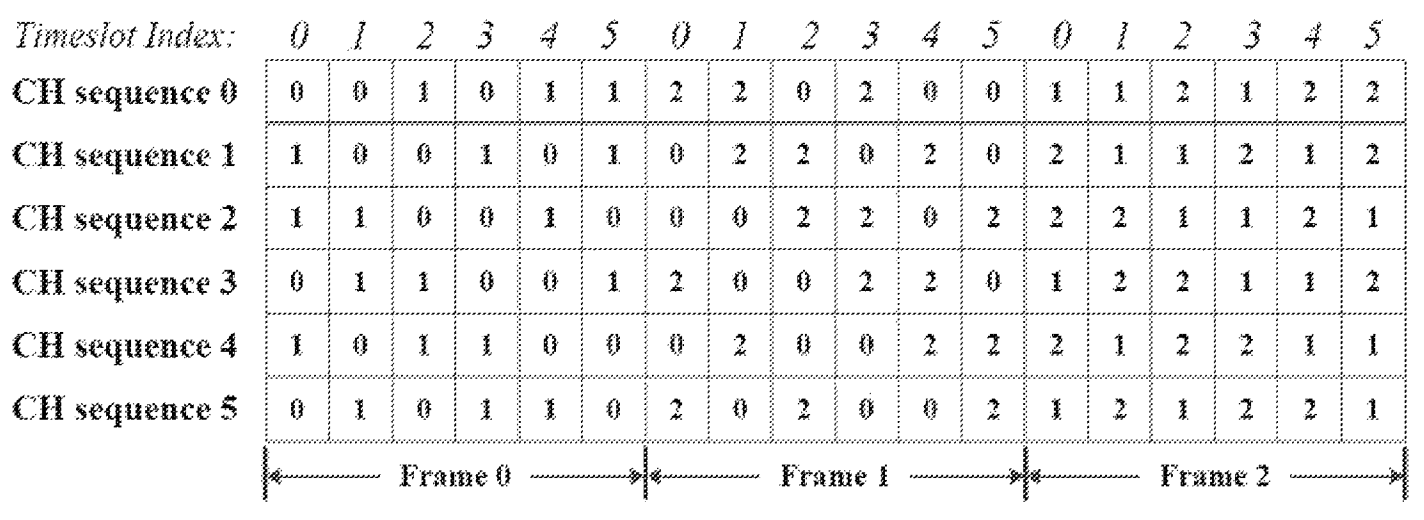

FIG. 1 shows the symmetric synchronous CH system constructed based on a (2, 6, 3)-UDMDS, which can be partitioned into two disjoint (6, 3)-MDSs {0, 1, 3} ⊆$Z_6$ and {2, 4, 5} ⊆$Z_6$. It comprises 6 18-timeslot periodic CH sequences, of which each period comprises 3 frames and each frame comprises 6 timeslots.

Because any two CH sequences in this system can rendezvous at the channels 0, 1, and 2, the DoR of this CH system is 3.

Because the maximal time interval for two CH sequences to rendezvous consecutively at two channels, which may be different or same, or a common channel is 5 or 17 timeslots, respectively, e.g., after the CH sequences 2 and 4 rendezvous at the channel 1 in the timeslot 0 of frame 0, they should wait until the timeslot 5 of the same frame for the next rendezvous at the channel 0 and until the timeslot 5 of frame 2 for the next rendezvous at the channel 1. Thus the MTTR and MCTTR of the CH system is 5 and 17, respectively.

In each period of 18 timeslots, because each CH sequence i∈(0, 5) can rendezvous with the CH sequence (i+1 mod 6), (i+2 mod 6), . . . , or (i+5 mod 6) for 6, 6, 12, 6, or 6 times, respectively, the ATTR between them is 3, 3, 1.5, 3, or 3. Thus the ATTR of the CH system is 2.7.

In each timeslot of a period, at most 3 CH sequences can hop to a same channel. Thus the CL of the CH system is 1/2.

Figure 2:
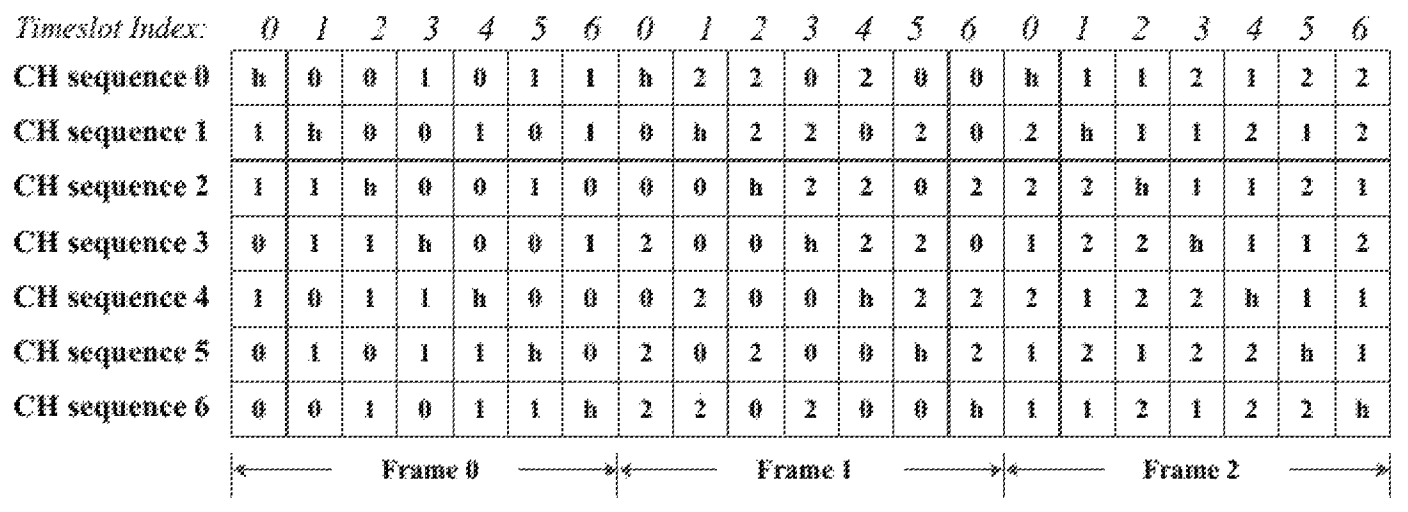

Similarly, FIG. 2 shows the symmetric synchronous CH system constructed based on a (2, 7, 3)-UDMDS, which can be partitioned into two disjoint (7, 3)-MDSs {1, 2, 4} ⊆$Z_7$ and {3, 5, 6} ⊆$Z_7$. It comprises 7 21-timeslot periodic CH sequences, of which each period comprises 3 frames and each frame comprises 7 timeslots. The metrics of this CH system include DoR=3, MTTR=6, ATTR=3.5, MCTTR=20, and CL=3/7.

Figure 4:
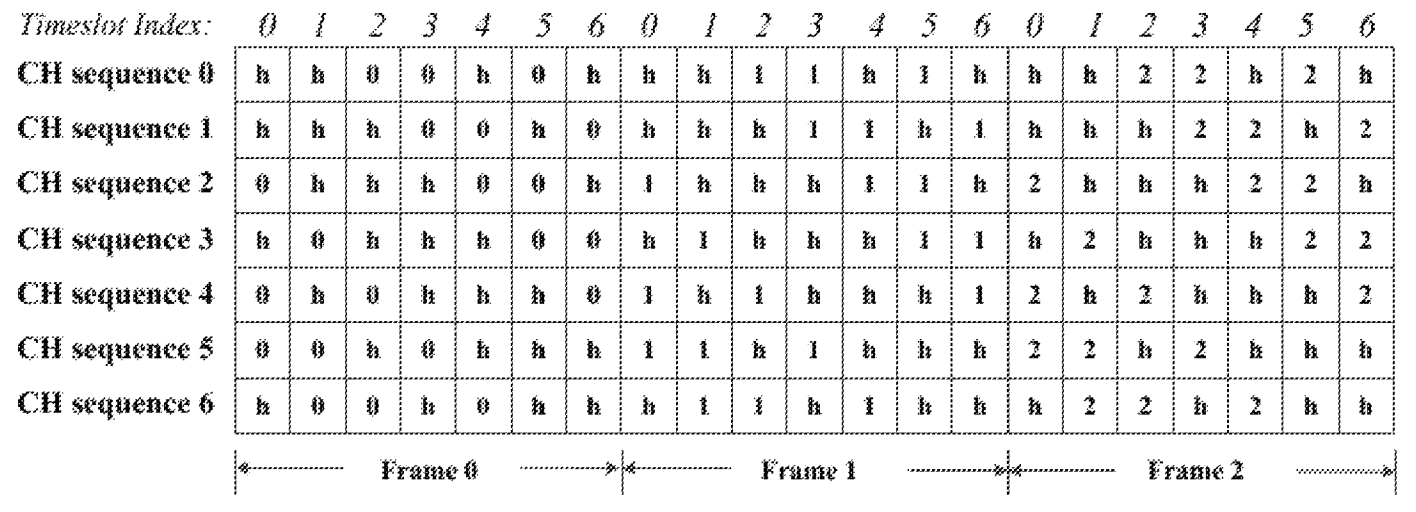

Meanwhile, FIG. 3 depicts the existing M-QCH constructed based on a (3, 2)-MDS {0, 1} ⊆$Z_3$, while FIG. 4 the existing L-QCH constructed based on a (7, 3)-MDS {0, 1, 3} ⊆$Z_7$. The former comprises 3 9-timeslot periodic CH sequences and the latter 3 21-timeslot periodic CH sequences. The metrics of the M-QCH in FIG. 3 include DoR=3, MTTR=3, ATTR=3, MCTTR=9, and CL=2/3, while those of the L-QCH in FIG. 4 include DoR=3, MTTR=7, ATTR=7, MCTTR=21, and CL=3/7. Thus, to achieve a DoR of 3, The proposed symmetric synchronous CH system based on a (2, 6, 3)-UDMDS incurs a shorter ATTR, a smaller CL, and larger MTTR and MCTTR than the M-QCH The proposed symmetric synchronous CH system based on a (2, 7, 3)-UDMDS incurs shorter MTTR, ATTR, and MCTTR than and a same CL as the L-QCH based on a (7, 3)-MDS.

Moreover, FIG. 5 depicts the existing RRICH with the DoR of 3, while FIG. 6 the existing CACH with DoR=3 and u=2. The former comprises 6 12-timeslot periodic CH sequences and the latter 4 9-timeslot periodic CH sequences. The metrics of the RRICH in FIG. 5 include DoR=3, MTTR=4, ATTR=4, MCTTR=12, and CL=1/2, while those of the CACH in FIG. 4 include DoR=3, MTTR=3, ATTR=3, MCTTR=9, and CL=1/2. Thus, for a given DoR=3, the proposed symmetric synchronous CH system based on a (2, 6, 3)-UDMDS incurs a shorter ATTR and a larger MTTR or MCTTR than the CACH in FIG. 6 as well as a same CL as the latter, while that based on a (2, 7, 3)-UDMDS incurs a shorter ATTR, a larger MTTR or MCTTR, and a smaller CL than the RRICH in FIG. 5.

To compare the performance of the six symmetric synchronous CH systems in FIG. 1-FIG. 6, we simulates an ad hoc CRN of CUs, which locate within a 10 km×10 km area uniformly and can access N∈(1, 10) disjoint spectrum channels with uniform bandwidth. Unless other specified, each channel accessible by the CRN is licensed to PUs and its occupation by PUs is assumed to follow an ON/OFF model, where the time length of ON and OFF periods should follow the exponential distribution with the parameters 1 and 1/3, respectively. Each CU is assigned with a distinct 10-bit MAC address. The wireless link between each pair of cognitive transmitter and receiver can be modeled as $P_r = P_s - (32.44 + 201gD + 201gF)$, where $P_s$ and $P_r$ are the transmitting and receiving powers of the link, respectively, D the distance between cognitive transmitter and receiver, and F the central frequency of the licensed channel. Other simulation parameters are summarized in Table 1. To avoid possible fluctuation, each simulation in the sequel is performed for at least 50 times to generate average results.

TABLE 1

Simulation Parameters

| | | | |
|---|---|---|---|
| Length of data packets | 1024 bytes | Average time interval for packet generation | 0.01 s |
| Length of RTS | 20 bytes | Length of CTS | 20 bytes |
| Power threshold for successful reception | −95 dBm | Transmission power | 0.005 W |
| Channel bandwidth | 22 MHz | Central frequency of the channel i∈ (0, N − 1) | 2379 + 22 iMHz |
| RTS retransmission times in a timeslot | 4 | Length of a timeslot | 100 ms |
| Channel transmission rate | 11 Mbps | Buffer size at each CU | 64000 bytes |

Under a synchronized mutually disjoint (n, k)-MDSs from the set Ω heuristically.

The invention claimed is:

1. A method for generating a distributed channel hopping system in cognitive radio networks, the method comprising:
   1) constructing a symmetric asynchronous Channel Hopping (CH) system comprising n periodic CH sequences and a degree of rendezvous (DoR) being N, and constructing the n periodic CH sequences based on the on an n, k)-UDDSs ROT (U, 0), . . . , ROT (U, i), . . . , and ROT (U, n), such that each period of a CH sequence comprises exactly L frames and each frame comprises n timeslots, wherein each period of a CH sequence comprises nL timeslots, L=N/gcd(M, N), M is a positive integer, N is a positive integer, M≥N, and gcd(M, N) denotes a greatest common divisor of M and N; $Z_n$ represents a set {0, 1, . . . , n−1}; an (n, k)-DS represents a k-element subset of $Z_n$, wherein each of the non-zero integers 1, 2, . . . , n−1 modulo n is a difference between two elements in the (n, k)-DS, an (M, n, k)-UDDS represents an Mk-element subset of $Z_n$, wherein Mk≤n, the (M, n, k)-UDDS comprises M mutually disjoint k-element sets, each of the mutually disjoint k-element sets is an (n, k)-DS, an (M, n, k)-UDDS U represents a set U that is an (M, n, k)-UDDS, and an (M, n, k)-UDDS ROT(U, i) represents a rotation of the (M, n, k)-UDDS U by a distance i;
   2) labelling by 0, 1, 2, 3, . . . , , n−1 the n periodic CH sequences in the constructed CH system, by $U_{i,0}$, $U_{i,1}$, $U_{i,2}$, $U_{i,3}$, . . . , $U_{i,j}$, . . . , $U_{i,M-1}$ the M mutually disjoint (n, k)-DSs partitioned from the (M, n, k)-UDDS ROT (U, by $t_{i,j,0}$, $t_{i,j,1}$, $t_{i,j,2}$, $t_{i,j,3}$, . . . , $t_{i,j,d}$, . . . , $t_{i,j,k-1}$ the k timeslots belonging to the (n, k)-DS $U_{i,j}$, by 0, 1, 2, 3, . . . , j, . . . , N−1 the N rendezvous channels, by 0, 1, 2, 3, . . . , l, . . . , L−1 the L frames in each period of a CH sequence, and by 0, 1, 2, 3, . . . , i, . . . , n−1 the n timeslots in each frame;

3) hopping, by the CH sequence i, to the channel (lM+j mod N) in each timeslot $t_{i,j,k} \in U_{i,j}$ of the frame l, wherein mod represents a modulo operation, when the CH sequences a and b are constructed based on the (M, n, k)-UDDSs ROT(U, a) and ROT(U, b), respectively, a, b∈(0, n−1), the CH sequences a and b rendezvous at M different spectrum channels (lM mod N), (lM+1 mod N), (lM+M−1 mod N) in the frame l, wherein the total number of rendezvouses between the CH sequences a and b at all N channels in one period is not smaller than LM=MN/gcd(M, N), and the total number of rendezvouses between the CH sequences a and b at each channel in one period is not smaller than M/gcd(M, N), where l∈(0, L−1), i∈(0, n−1), j∈(0, M−1), $t_{i,j,d} \in (0, n-1)$, l is the label of the L frames in one period of each CH sequence, a, b, and i represent the rotation distance applied to the (M, n, k)-UDDS U or the label of the CH sequence constructed based on one rotation of the (M, n, k)-UDDS U, a≠b, j is the label of the M mutually disjoint (n, k)-DSs partitioned from one rotation of the (M, n, k)-UDDS U or the label of the N rendezvous channels, and $t_{i,j,d}$ represents the label of the k timeslots belonging to one (n, k)-DS partitioned from one rotation of the (M, n, k)-UDDS U; and 4) hopping, by the CH sequence i, to an arbitrary channel h∈{0, 1, . . . , N−1} in each timeslot t of the frame l that does not belong to the relative complement of the (M, n, k)-UDDS ROT(U, i) in $Z_n$, wherein M≥1, a symmetric asynchronous CH system with DoR=N based on an (N, n, k)-UDDS U⊆$Z_n$ is constructed, and a symmetric synchronous CH system with DoR=N based on an (M, n, k)-UDDS U⊆$Z_n$ subject to M≤N is constructed.

2. A method for generating a distributed channel hopping system in cognitive radio networks, the method comprising:
1) constructing an asynchronous Channel Hopping (CH) system comprising n periodic CH sequences; and constructing the n periodic CH sequences based on an (N, n, k)-UDDSs ROT (U, 0), . . . , ROT (U, i), . . . , and ROT (U, n), such that each period of a CH sequence comprises n timeslots; wherein $Z_n$ represents a set {0, 1, . . . , n−1}; an (n, k)-DS represents a k-element subset of $Z_n$, wherein each of the non-zero integers 1, 2, . . . , n−1 modulo n is a difference between two elements in the (n, k)-DS; an (N, n, k)-UDDS represents an Nk-element subset of $Z_n$, wherein Nk≤n, the (N, n, k)-UDDS comprises N mutually disjoint k-element sets, each of the mutually disjoint k-element sets is an (n, k)-DS; an (N, n, k)-UDDS U represents a set U that is an (N, n, k)-UDDS; and an (N, n, k)-UDDS ROT(U, i) represents a rotation of the (N, n, k)-UDDS U by a distance i;

2) labelling by 0, 1, 2, 3, . . . , n−1 the n periodic CH sequences in the constructed CH system, by 0, 1, 2, 3, . . . , n−1 the n timeslots in each period, by $U_{i,0}$, $U_{i,1}$, $U_{i,2}$, $U_{i,3}$, . . . , $U_{i,j}$, . . . , $U_{i,N-1}$ the N mutually disjoint (n, k)-DSs partitioned from the (N, n, k)-UDDS ROT(U, i), by $t_{i,j,0}$, $t_{i,j,1}$, $t_{i,j,2}$, $t_{i,j,3}$, . . . , $t_{i,j,d}$, . . . , $t_{i,j,k-1}$ the k timeslots belonging to the (n, k)-DS $U_{i,j}$, and by 0, 1, 2, 3, . . . , j, . . . , N−1 the N rendezvous channels;

3) hopping, by the CH sequence i, to the channel j in each timeslot $t_{i,j,d} \in U_{i,j}$ of every period, wherein when the CH sequences a and b are constructed based on the (N, n, k)-UDDSs ROT(U, a) and ROT(U, b), respectively, a, b∈(0, n−1), no matter the difference value r between their starting timeslots, the CH sequences a and b rendezvous at N different spectrum channels 0, 1, . . . , N−1 in each period, wherein the total number of rendezvouses between the CH sequences a and b at all N channels in one period is not smaller than N, and the total number of rendezvouses between the CH sequences a and b at each channel in one period is not smaller than 1, the average time to rendezvous between the CH sequences a and b is not lager than n/N, where r can be any real number, i∈(0, n−1), j∈(0, N−1), $t_{i,j,d} \in (0, n-1)$, a, b, and i represent the rotation distances applied to the (N, n, k)-UDDS U or the labels of the CH sequence constructed based on one rotation of the (N, n, k)-UDDS U, a≠b, j is the label of the N mutually disjoint (n, k)-DSs partitioned from one rotation of the (N, n, k)-UDDS U or the label of the N rendezvous channels, and $t_{i,j,d}$ represents the label of the k timeslots belonging to the (n, k)-DS $U_{i,j}$ partitioned from the rotation of the (N, n, k)-UDDS U by the distance i; and 4) hopping, by the CH sequence i, to an arbitrary channel h∉{0, 1, . . . , N−1} in each timeslot t of every period that does not belong to the relative complement of the (N, n, k)-UDDS ROT(U, i) in $Z_n$.

* * * * *